US009981864B2

(12) United States Patent
Sakurai et al.

(10) Patent No.: US 9,981,864 B2
(45) Date of Patent: May 29, 2018

(54) OILY WATER SEPARATOR, OIL-WATER SEPARATING METHOD AND FILTRATION MEMBRANE UNIT

(71) Applicant: TOYO ENGINEERING CORPORATION, Chiyoda-ku, Tokyo (JP)

(72) Inventors: Masaaki Sakurai, Narashino (JP); Kenji Sakai, Narashino (JP); Hidekiyo Hara, Narashino (JP); Kanako Abe, Narashino (JP); Takashi Nomura, Narashino (JP)

(73) Assignee: TOYO ENGINEERING CORPORATION, Chiyoda-ku, Tokyo (JP)

( * ) Notice: Subject to any disclaimer, the term of this patent is extended or adjusted under 35 U.S.C. 154(b) by 545 days.

(21) Appl. No.: 14/541,836

(22) Filed: Nov. 14, 2014

(65) Prior Publication Data

US 2015/0136697 A1 May 21, 2015

(30) Foreign Application Priority Data

Nov. 18, 2013 (JP) ................................ 2013-238063
Sep. 16, 2014 (JP) ................................ 2014-188019

(51) Int. Cl.
*C02F 1/44* (2006.01)
*B01D 63/02* (2006.01)
(Continued)

(52) U.S. Cl.
CPC ............. *C02F 1/444* (2013.01); *B01D 63/04* (2013.01); *C02F 1/44* (2013.01); *B01D 63/06* (2013.01);
(Continued)

(58) Field of Classification Search
CPC .... B01D 63/04; B01D 63/06; B01D 2313/12; B01D 2313/125; B01D 2313/21;
(Continued)

(56) References Cited

U.S. PATENT DOCUMENTS 5,192,456 A * 3/1993 Ishida .................... B01D 61/14
210/195.2
2002/0179517 A1* 12/2002 Pedersen ................ B01D 61/18
210/321.8
(Continued)

FOREIGN PATENT DOCUMENTS

JP 2003-144805 A 5/2003
JP 2010-248431 A 11/2010
JP 2011-084676 A 4/2011

OTHER PUBLICATIONS

English language machine translation for JP2003144805, 9 pages, No Date.*

*Primary Examiner* — Pranav N Patel
(74) *Attorney, Agent, or Firm* — Flynn, Thiel, Boutell & Tanis, P.C.

(57) ABSTRACT

An oily water separator for removing oil from oil-containing water, including a vessel, a filtration membrane unit and a discharge mechanism, the filtration membrane unit containing a filtration membrane module and a returning mechanism, the filtration membrane module for performing filtration in the state of allowing the module to be immersed into the oil-containing water, the filtration membrane module having an elongated filtration membrane with an opening portion, the opening portion of the filtration membrane being fixed to one end of the filtration membrane module, the opening portion of the filtration membrane being communicatively connected to the returning mechanism, and the returning mechanism being extended along the filtration membrane toward an end on a side opposite to an end
(Continued)

portion having the opening portion thereof, the returning mechanism being communicatively connected with the discharge mechanism.

21 Claims, 12 Drawing Sheets

(51) Int. Cl.
*B01D 63/04* (2006.01)
*C02F 101/32* (2006.01)
*C02F 103/10* (2006.01)
*B01D 63/06* (2006.01)
*B01D 69/02* (2006.01)
*B01D 71/36* (2006.01)
*C02F 1/24* (2006.01)
*C02F 1/40* (2006.01)
*C02F 103/36* (2006.01)

(52) U.S. Cl.
CPC .............. *B01D 69/02* (2013.01); *B01D 71/36* (2013.01); *B01D 2311/2661* (2013.01); *B01D 2313/56* (2013.01); *B01D 2317/04* (2013.01); *B01D 2317/06* (2013.01); *B01D 2319/04* (2013.01); *C02F 1/24* (2013.01); *C02F 1/40* (2013.01); *C02F 1/441* (2013.01); *C02F 1/442* (2013.01); *C02F 2101/32* (2013.01); *C02F 2103/10* (2013.01); *C02F 2103/365* (2013.01); *C02F 2303/16* (2013.01); *Y10T 29/4973* (2015.01); *Y10T 29/49721* (2015.01)

(58) Field of Classification Search
CPC ............ B01D 2313/56; B01D 2317/04; B01D 2317/06; B01D 2311/2661; B01D 2319/04; C02F 1/40; C02F 1/44; C02F 1/441; C02F 1/442; C02F 1/444; C02F 2201/32; C02F 2103/10; C02F 2103/365
See application file for complete search history.

(56) References Cited

U.S. PATENT DOCUMENTS

| 2011/0089013 | A1* | 4/2011 | Sakurai | B01D 17/0205 201/2 |
| 2012/0103904 | A1* | 5/2012 | Morita | B01D 61/147 210/650 |
| 2012/0248023 | A1* | 10/2012 | Zacharias | B01D 63/02 210/236 |

* cited by examiner (a)

(b)

Section A-A

OILY WATER SEPARATOR, OIL-WATER SEPARATING METHOD AND FILTRATION MEMBRANE UNIT

TECHNICAL FIELD

The present invention relates to an oily water separator for oil-containing water such as produced water to be produced upon drilling crude oil, bitumen, a natural gas or the like, an oil-water separating method, a filtration membrane unit and a method for exchanging the filtration membrane units.

BACKGROUND ART

Upon drilling crude oil, bitumen, a natural gas or the like, together with the production of oil or gas, ground water intermingled therewith is discharged as produced water. Besides, when water (steam) is injected into an oil field or a gas field for drilling the crude oil or the like, the water may also be discharged as produced water. Such produced water may contain various kinds of chemical compositions or oil according to the features of a stratum or an injected chemical. Therefore, it has been generally implemented that these concentrations are reduced by applying water treatment prior to discharging it to the outside or, alternatively, re-injecting it into the oil field, the gas field, an aquifer or the like. Above all, in a water shortage area, water can hardly be secured in a sufficient amount to be used for water flooding. As such, it has been more frequent that the produced water is treated to be used as injected water. With regard to discharging the produced water into the sea or rivers or reinjection, regulations are particularly reinforced in recent years in response to the rising consciousness of environmental issues. Thus, the development of advanced water treatment technology is highly expected.

With regard to the treatment of the produced water (oil-containing water), a conventional technique has been applied as below exemplified (see FIG. 10). Crude oil fluid mixture 20A drilled from underground (oil well) 1 is sent to HP separator 2. Crude oil-containing liquid treated herein is sent in feed direction $d_1$, and further treated by means of LP separator 3. The liquid is then cooled by means of heat exchanger 51b to the extent in which the treated liquid is not boiled. The resulting liquid is further treated by means of dehydrator 4, and shipped as crude oil (product) (in the drawing, a butterfly-shaped part in which two isosceles triangles are combined represents a valve).

Apart therefrom, oil-containing produced water (referred to as oil-containing water, produced water or the like in several cases) 20B separated by means of HP separator 2 is sent in a feed direction $d_2$, cooled to a predetermined temperature by means of heat exchanger 51a, and then once stored in skim tank 5. At this time, part of produced water is separated also from LP separator 3, and mixed with produced water from the HP separator. An evaporative gas is also generated in HP separator 2 and LP separator 3, and it is also discharged to the outside, respectively. Subsequently, the oil is separated and removed in a flow of induced gas flotation 6 and oil removal filter 7 using walnut shells or the like, and conventional treated water 20D' is recovered (defined as 20D' so as to be distinguished from treated water 20D of the present invention as described later). Oil-water separation in this method is achieved basically by gravity separation utilizing a difference in specific gravity between oil and water.

As a specific technology development, Patent Literature 1 discloses an example of separating and removing oil from water which is brought with crude oil upon drilling it from a submarine oil field. This literature also discloses an example of applying microbial treatment to water which is obtained by oil-water separation through induced emulsion breaking.

CITATION LIST

Patent Literature

Patent Literature 1: JP-A-2003-144805 ("JP-A" means unexamined published Japanese patent application)
Patent Literature 2: JP-A-2010-248431
Patent Literature 3: JP-A-2011-084676

SUMMARY OF INVENTION

Technical Problem

Relating to the above described technology, the present inventors previously developed an oily water separator to be adapted mainly for drilling and yielding bitumen. Specifically, Patent Literature 2 states the application of a filtration membrane of polytetrafluoroethylene (PTFE) to the purification treatment of oil-containing water (produced water). Patent Literature 3 further states a mechanism, in the oily water separator, for reducing the performance deterioration caused by the attachment of oil to a surface of a filtration membrane to efficiently discharge a highly concentrated oil in a system to the outside thereof. According to these technologies, oil-containing water can be further treated efficiently and effectively in comparison with a conventional system shown in FIG. 10 above. Moreover, in comparison with a case of using a filtration membrane made from ceramics, the maintenance is simpler and also excellent in working efficiency or economic efficiency.

The present inventors considered as to a further application of the technology on treatment of oil-containing water which they have developed as above. They specifically studied the possibility to widely apply their technology not only to the drilling of bitumen but also to the treatment of produced water containing oil such as crude oil and natural gas. Moreover, upon the study, the present inventors revealed improvement points of the oily water separator involved in the invention as disclosed in Patent Literatures 2 and 3, and hence the present inventors were in pursuit of advance research and development of apparatus having a further enhanced utility.

In view of the particular aspects as to the treatment of produced water brought upon by drilling for crude oil, natural gas or the like, the present invention addresses to the provision of an oily water separator that can attain a high filtration performance. Further, the present invention addresses to the provision of an oily water separator that can attain an improved working efficiency of exchanging filtration membrane units, excellent handling and operation management properties, and advanced oil-water separation of oil-containing water. Moreover, the present invention addresses the provision of an oil-water separation method using the oily water separator, a filtration membrane unit used therefor, and a method for exchanging the filtration membrane.

Solution to Problem

That is, according to the present invention, there is provided the following means:

(1) An oily water separator for removing oil from oil-containing water, comprising a vessel, a filtration membrane unit and a discharge mechanism;

the filtration membrane unit comprising a filtration membrane module and a returning mechanism, the vessel capable of receiving oil-containing water being introduced therein, the filtration membrane module and the returning mechanism installed in the vessel, the filtration membrane module for performing filtration in the state of allowing the module to be immersed into the oil-containing water;

the discharge mechanism for discharging treated water to the outside of the vessel, the treated water produced by filtering the oil-containing water with the filtration membrane unit, the discharge mechanism being communicatively connected with the filtration membrane unit;

the filtration membrane module having an elongated filtration membrane with an opening portion, the opening portion of the filtration membrane being fixed to one end of the filtration membrane module, the opening portion of the filtration membrane being communicatively connected to the returning mechanism;

the returning mechanism being extended along the filtration membrane toward an end on a side opposite to an end portion having the opening portion thereof, the returning mechanism being communicatively connected with the discharge mechanism.

(2) The oily water separator according to (1), wherein the vessel is vertical.

(3) The oily water separator according to (1) or (2), wherein the vessel has a cylindrical body and a curved surface shaped head.

(4) The oily water separator according to any one of (1) to (3), wherein the filtration membrane is made of polytetrafluoroethylene (PTFE).

(5) The oily water separator according to any one of (1) to (4), wherein the filtration membrane is defined as a hollow fiber membrane or tubular membrane.

(6) The oily water separator according to (5), wherein the filtration membrane is defined as a cylindrically-shaped hollow fiber membrane or tubular membrane, the filtration membrane is folded in a longitudinal direction thereof, and opening portions on both ends are fixed on one end of the filtration membrane module.

(7) The oily water separator according to any one of (1) to (6), further comprising a gas bubble generation means for feeding gas bubbles toward the filtration membrane unit.

(8) The oily water separator according to any one of (1) to (7), further comprising a recovering mechanism for recovering oil on or near a liquid surface of the oil-containing water.

(9) The oily water separator according to any one of (1) to (8), wherein there exists a removal space above the filtration membrane unit in the vessel for removing the filtration membrane unit, and the removal space has a height substantially equal to or higher than a height of the filtration membrane unit.

(10) The oily water separator according to (8) or (9), wherein the recovering mechanism has a partition wall vertically disposed from an inside of a liquid toward a liquid surface to recover oil on or near the liquid surface of the oil-containing water over the partition wall.

(11) The oily water separator according to any one of (1) to (10), wherein the filtration membrane is defined as a cylindrically-shaped hollow fiber membrane or tubular membrane, and the filtration membrane module has a plurality of cylindrically-shaped hollow fiber membranes or tubular membranes.

(12) The oily water separator according to any one of (1) to (11), wherein the filtration membrane is defined as a hollow fiber membrane, and a pore size of the hollow fiber membrane is 0.0001 to 1 µm.

(13) The oily water separator according to any one of (9) to (12), wherein the removal space has a volume in which a person can enter and do work.

(14) The oily water separator according to any one of (1) to (13), wherein a rising flow channel of oil-containing water is disposed in the vessel and the rising flow channel extends upward from a bottom portion of the vessel so as to feed oil-containing water into the rising flow channel.

(15) The oily water separator according to any one of (1) to (14), further comprising a means for feeding a chemical into the oil-containing water which is introduced into the vessel.

(16) An oil-water separating method for removing oil from oil-containing water by means of the oily water separator according to any one of (1) to (15).

(17) The oil-water separating method according to (16), wherein the oil concentration in the oil-containing water is 50 to 3,000 ppm and the oil concentration in the treated water reduced to 5 ppm or less by filtering the oil-containing water.

(18) The oil-water separating method according to (16) or (17), wherein the temperature of the oil-containing water inside the vessel is 10 to 150° C. and pressure is 0 to 10 kg/cm$^2$G.

(19) A filtration membrane unit comprising a filtration membrane module and a returning mechanism;

the filtration membrane module being formed in an elongated structure, the filtration membrane module having a filtration membrane and an upper sealing material, the returning mechanism being disposed along a longitudinal direction of the filtration membrane;

the filtration membrane having an opening portion, the opening portion being fixed and held to the upper sealing material, the opening portion being communicatively connected to the returning mechanism.

(20) The filtration membrane unit according to (19), wherein the filtration membrane comprises a plurality of hollow fiber membranes, and the hollow fiber membranes are folded in a longitudinal direction thereof, and opening portions on both ends are fixed to the upper sealing material.

(21) The filtration membrane unit according to (19) or (20), wherein the returning mechanism has an upper cap, an individual line (filtered water outlet pipe), a buffer line (filtered water header pipe) and a returning line (filtered water return pipe), and the upper cap, the individual line, the buffer line and the returning line are communicatively connected with a plurality of the filtration membrane modules, respectively, the filtration membrane modules are disposed in parallel in alignment with the directions of the opening portions of the filtration membranes, the upper cap and the upper sealing material to which the opening portion of the filtration membrane module is fixed are communicatively connected on one end, the upper cap and the individual line are fixed and communicatively connected on an end on a side opposite to the end on which the upper sealing material and the upper cap are communicatively connected, the individual line and the buffer line are fixed and communicatively connected on an end on a side opposite to the end on which the upper cap and the individual line are connected, the buffer line and the returning line are fixed and communicatively connected on an end on a side opposite to the end on which the individual line and the buffer line are connected, the buffer line is communicatively connected with a plurality of the individual lines, the returning line is installed in a substantial center of the plurality of the filtration membrane modules by being surrounded by the plurality of the filtration membrane modules, an end on a side opposite to the end on which the returning line and the buffer line are connected is extended in a direction in which the upper sealing material exists, and the returning line has a flange that can be fixed to any other line on an end portion of the returning line.

(22) A method for exchanging the filtration membrane units in the oily water separator according to any one of (1) to (15), the vessel in the oily water separator having, in an upper part thereof, a carrying-in and carrying-out opening capable of removing the filtration membrane unit therefrom, the vessel also having manholes in an upper side portion of the vessel and in a lower part of the vessel, the method comprising:

releasing a connection between the filtration membrane unit and the discharge mechanism, the filtration membrane being placed in the oily water separator, by entering the vessel from the manhole provided in the lower part of the vessel, the manhole being accessible to the connection; and removing a released filtration membrane unit from the carrying-in and carrying-out opening in the upper part of the vessel, by entering the vessel from the manhole provided in the upper side portion of the vessel.

(23) The method for exchanging the filtration membrane units according to (22), the method further comprising:

inserting a filtration membrane unit for exchange into the vessel from the carrying-in and carrying-out opening at the upper part of the vessel;

placing the filtration membrane unit for exchange in an original place in which the removed filtration membrane unit has been placed; and bringing the placed filtration membrane unit for exchange into connection with the discharge mechanism.

The terms "communicatively connected" or "communicative connection" herein means formation of a state in which a fluid flows. The terms typically mean that two or more members are connected in the state in which the fluid can flow. Individual members here may be connected with any other intervening member, or otherwise the members may be formed in the state in which the fluid can flow in a state in which the individual members are separated. The term "elongate" or "extend" means that a long member is disposed or arranged in a state in which a longitudinal direction thereof is directed toward a predetermined direction.

Advantageous Effects of Invention

According to an oily water separator, an oil-water separation method and a method for exchanging filtration membrane units of the present invention, the filtration performance is high, and when necessary, the working efficiency of exchanging the filtration membrane units having a filtration membrane module can be improved, and handling properties and operation management properties are satisfactory, and advanced oil-water separation of oil-containing water can be made.

Moreover, the filtration membrane unit of the present invention can be preferably utilized for an excellent oily water separator and an excellent oil-water separation method as described above.

Other and further features and advantages of the invention will appear more fully from the following description, appropriately referring to the accompanying drawings.

BRIEF DESCRIPTION OF THE DRAWINGS

FIG. 2-1 is an enlarged sectional side view schematically showing the oily water separator shown in FIG. 1.

FIG. 2-2 is a cross-sectional view in a view II of the oily water separator in FIG. 2-1.

FIG. 7-1 is a sectional side view schematically showing an oily water separator related to another preferred embodiment of the present invention.

FIG. 7-2 is a cross-sectional view in a view A of the oily water separator in FIG. 7-1.

FIG. 7-3 is a cross-sectional view (modified example 1) of an oily water separator.

FIG. 7-4 is a cross-sectional view (modified example 2) of an oily water separator.

MODE FOR CARRYING OUT THE INVENTION (Oil-Water Separation System)

Figure 1:
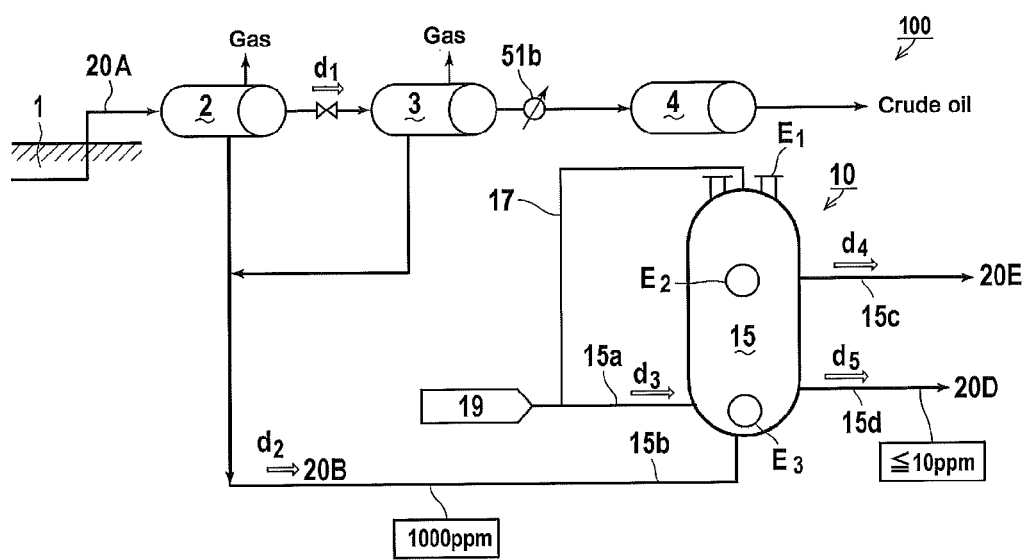
FIG. 1 is a flow diagram schematically showing a process of filtering oil-containing water in the production of crude oil as one embodiment of the present invention.
Figures 1, 2:
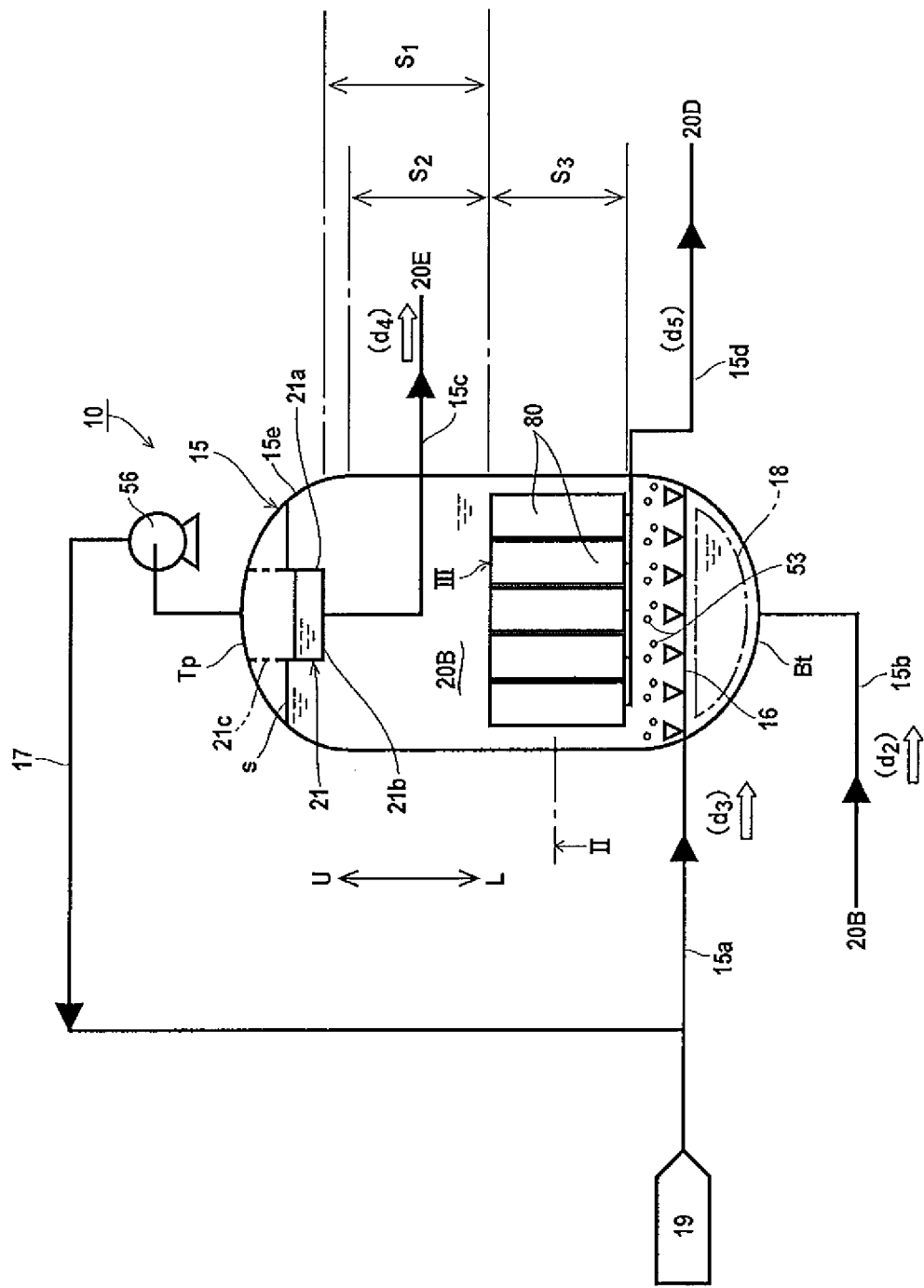
Figure 2:
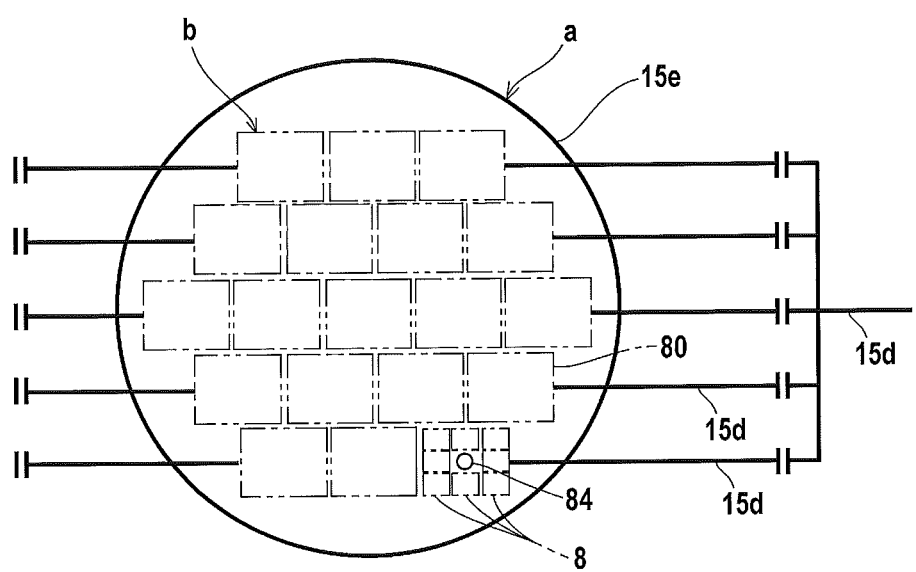
Figure 10:
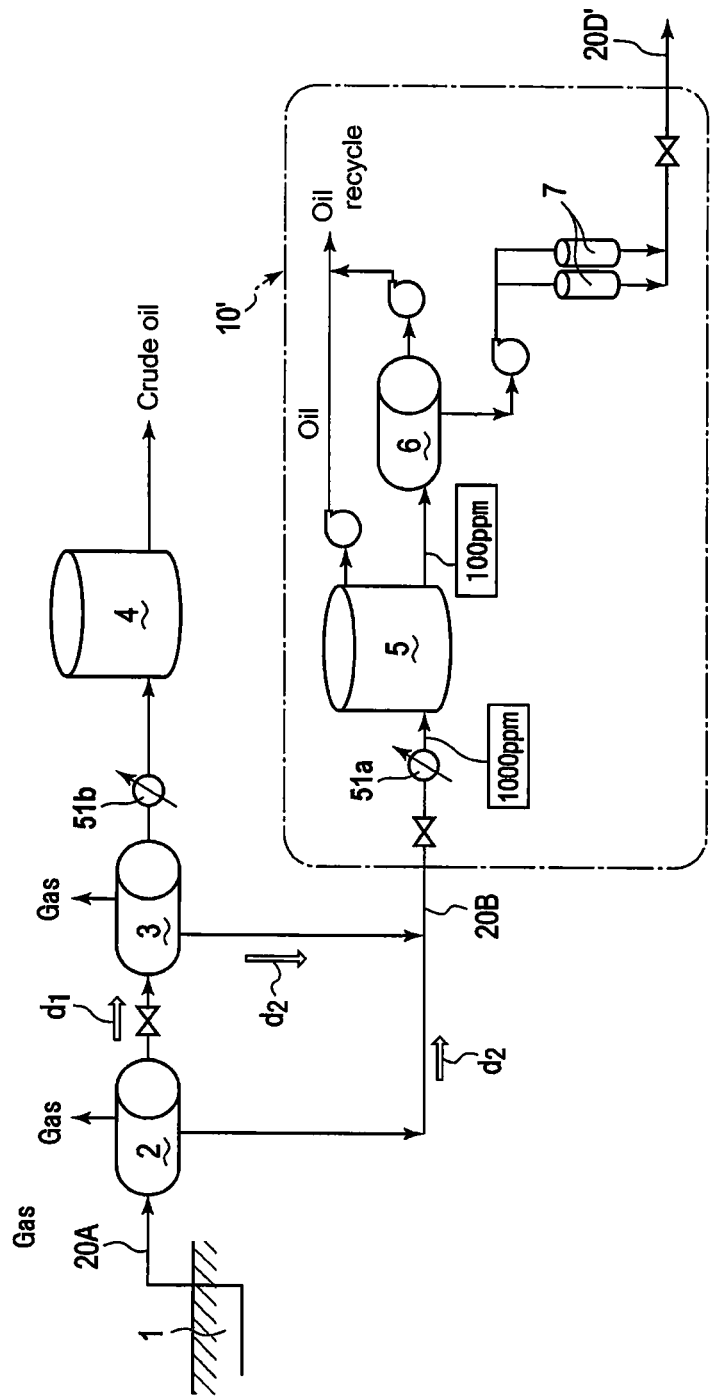
FIG. 10 is a flow diagram schematically showing a process related to a conventional art by which oil-containing water is filtered in the production of crude oil.

FIG. 1 shows an example of a use aspect of one embodiment of the oily water separator of the present invention, and is a flow diagram schematically showing a process of filtering the oil-containing produced water in the production of the crude oil. In the step shown in the diagram, crude oil fluid mixture 20A is drilled from oil well 1. Natural gas, water, sand, heavy metals and so forth are contained therein. Although the description is schematically made from here also in the above, the crude oil fluid mixture is decompressed, and then crude oil fluid mixture 20A is sent to HP separator 2 and LP separator 3 to be separated into crude oil, natural gas and water by means of the separators or the like. The separated water is oil-containing water (hereinafter, also referred to as oil-containing produced water in several cases), and is oil-contaminated water containing a large amount of oil. This oil-containing produced water 20B is introduced into oily water separator 15 (see FIG. 2-1) related to the present invention, and the oil is eliminated from the water 20B. In FIG. 2-1, the entire mechanism (vessel 15e and a mechanism thereinside, gas header 19, lines 15a to 15d, and 17) shown therein is referred to as oil-water separation apparatus 10, and vessel 15e and the mechanism thereinside are referred to as oily water separator 15. In this regard, oily water separator 15 per se herein is also included in the oil-water separation apparatus in the broad sense. On the other hand, when a total flow including the entire step in the drilling as shown in FIG. 1 is referred to, apparatus 10 is distinguished as oil-water separation system 100 in several cases. In addition, the boxed concentrations described in FIG. 1 and FIG. 10 show oil concentrations. The concentration downstream of the oil removal filter in FIG. 10 shows an actual value, and others show designed values. However, the present invention should not be interpreted as limited to the description of the specific concentration or the like.

(Treatment Conditions)

When the crude oil is drilled, in a state in which the pressure in an oil reservoir is high, the crude oil spontaneously spouts (makes natural flow), but in a state in which the pressure in the oil reservoir is low, the crude oil makes no natural flow and is pumped up by means of a pump. These methods are referred to as primary recovery. Many oil reservoirs are highly pressurized, and the case of 150 kg/cm$^2$G (G stands for a gauge pressure) or more is not uncommon. In this case, the pressure is decreased by means of a pressure reducing valve and the operating pressure in the HP separator is adjusted to 20 to 50 kg/cm$^2$G in many cases. Ordinarily, only a part of the crude oil included in the oil reservoir can be recovered, and in an oil well from which no production can be made in the primary recovery, the produced water or the natural gas after the crude oil is separated is injected into the oil reservoir, and remaining crude oil is pressurized and recovered. This operation is referred to as secondary recovery. A method for injecting water is referred to as "water flooding," a method for injecting gas is referred to as "gas injection," and both are collectively referred to as improved oil recovery in several cases. As of the beginning of the 21st century, when an increase in an amount of recovery is comprehensively prospected by the injection, the water or the gas is injected from the beginning of the primary recovery in a general way. In order to recover the crude oil remaining even in the secondary recovery, development and practical realization of a technology referred to as enhanced oil recovery (EOR) or forced recovery have been progressing. This method is to inject steam, carbon dioxide gas, a surfactant (detergent) or the like to improve the fluidity of the crude oil. In a preferred embodiment of the present invention, the art can be preferably applied to the case where the produced water is subjected to a treatment including oil-water separation during the primary recovery and discharged to the sea or rivers, or the case where the produced water is subjected to oil-water separation in the water flooding in the secondary recovery and used as injection water, and further as boiler feed water for steam injection in the enhanced oil recovery.

The temperature of the produced water (oil-containing water) is not particularly limited, but is preferably 10° C. or higher, and further preferably 40° C. or higher. The upper limit is preferably 150° C. or lower and further preferably 120° C. or lower. Upon request, an operation may be performed at a temperature of 100° C. or lower, or 80° C. or lower. Thus, the oil-water separation can be made at a high temperature, and thus treated water can be obtained without positively cooling the drilled oil-containing water. Moreover, when the resulting treated water having a high temperature is fed into the boiler, and used again as the injection steam for drilling, heating is made unnecessary or a range thereof is reduced. Accordingly, realization of oil-water separation while the temperature is kept high synergistically leads to a reduction of energy consumption as a recycle system of water.

In a preferred embodiment of the present invention, the embodiment can be preferably applied to the oil-containing water containing highly concentrated oil as high as 1,000 to 3,000 ppm. Further, the embodiment can be also preferably applied even to the case where highly concentrated suspended solids (SS) as high as 500 to 2,000 ppm simultaneously exist. The art can deal with the above cases by means of a single-stage oily water separator. Heat exchanger 51a can be made unnecessary. Moreover, feeding of the oil-containing produced water from the HP separator at a high pressure is utilized, and a hydrocyclone is installed to roughly remove the oil and the SS, and then the resultant material after removing the oil and the SS may be provided for the oily water separator. In this case, the oily water separator can be expected to attain a further stabilized performance.

Details in each area of crude oil drilling are as described below.

Well Site Area

As a produced fluid, gas and liquid from a well head separator are collected into a header, and sent toward an oil-water separation area.

Oil-Water Separation Area

The produced fluid ordinarily goes into a two-stage oil separator (the HP separator and the LP separator), and is separated into three phases including gas (hydrocarbon, moisture and a small amount of hydrogen sulfide), crude oil and produced water. The crude oil is further transferred to a dehydrator and is dehydrated to about 0.5% by mass.

Oil Removal Area

The oil-containing produced water from the oil-water separation area contains about 1,000 ppm of oil. The basic configuration in this area has three including skim tank 5, induced gas flotation and an oil-water separation filter (walnut shells or the like), and the oil is removed by means of each equipment. The unit of "ppm" herein is based on mass, unless otherwise noted.

In a flow of the present embodiment, oil-containing produced water 20B of which state is maintained at about 120° C. (for example, 10 to 150° C. in terms of the range) is sent to oily water separator (deoiling drum) 15.

FIG. 1 shows an example in which 1,000 ppm of oil is contained in oil-containing produced water 20B. In view of the range in which the advantageous effects of the present invention become significant, the range is preferably 50 ppm or more, further preferably 100 ppm or more, and particularly preferably 200 ppm or more. The upper limit is not particularly limited, but is preferably 3,000 ppm or less, further preferably 1,000 ppm or less, and particularly preferably 500 ppm or less.

The oil concentration in the treated water 20D after treatment can be appropriately set up at the concentration as a target upon request. When the oil is adjusted to a low oil concentration, the oil concentration is preferably suppressed to 10 ppm or less, further preferably 5 ppm or less, and still further preferably 1 ppm or less.

According to the conventional separation method shown in FIG. 10, a multi-stage process such as a pretreatment is required, and the oil concentration of the treated water is frequently over 10 ppm in actuality.

With respect to the required water quality in regard to the oil in the produced water after treatment (treated water) when the water is discharged into the sea or the rivers, although the criterion differs from country to country, it is 15 to 30 ppm in many cases, but as in Kazakhstan, 0.5 ppm offshore in several cases. Concerns about the environmental pollution are further growing in the future, and application of a further stringent regulation value is also expected. However, the present invention also can comply with such a stringent regulation value.

One example of the required water quality with regard to the water for injection to be used in the water flooding is described below.

| Oil: | 5 ppm |
| --- | --- |
| SS: | 0.1 ppm |
| Maximum allowable particle of 1 μm or larger: | 5 particles per mL |
| Dissolved oxygen: | 10 ppb (vol) $O_2$ |
| Bacteria: | 50 MPN/mL |
| (MPN: Most Probable Number) | |
| (mL: Milliliter) | |
| Anaerobic bacteria: | 50 MPN/mL |

According to the conventional treatment method (FIG. 10), it is quite difficult to satisfy these requirements. However, according to a preferred embodiment of the present invention, these requirements can be positively and stably attained. Further, if the produced water from which the oil is removed by means of PTFE membrane is subjected to softening and desiliconizing treatment by lime softening, and further subjected to softening treatment by an ion exchange resin, the oil-containing water can be used as boiler feed water. Examples of the required water quality include: hardness; 0.5 mg/L as $CaCO_3$, silica; 50 mg/L as $SiO_2$, and TDS; 7,000 mg/L.

The fluid (water to be treated) to be treated in the present invention is oil-containing water such as the produced water to be produced upon production of crude oil or the like. In the oil thus produced, upon being drilled from underground, as is different from vegetable oil, for example, treatment by filtration becomes significantly difficult in relation to viscosity, mixing of an impurity, or the like.

A preferred embodiment of the oily water separator (oil-water separation apparatus) of the invention is described in more detail based on FIGS. 2 to 5. FIG. 2-1 is a sectional side view schematically showing, in an enlarged scale, the oily water separator shown in FIG. 1. FIG. 2-2 is a cross-sectional view in a view II in FIG. 2-1.

(1) Oily Water Separator (Vessel)

Oily water separator 15 of the present embodiment is constituted of vertical cylindrical vessel 15e as a body of equipment. The material of vessel 15e is not particularly limited, but the material only needs to be appropriately selected according to the requirements of the operating conditions and manufacturing, and cost, such as one made from iron, stainless steel and a special alloy. The size or shape of vessel 15e is not particularly limited, but in assuming the application of efficient treatment at a site of drilling the crude oil or the natural gas, the size, in terms of internal volume, is preferably 40 $m^3$ or more, further preferably 50 $m^3$ or more, and particularly preferably 60 $m^3$ or more. The upper limit is practically preferably 100 $m^3$ or less, further preferably 90 $m^3$ or less, and particularly preferably 80 $m^3$ or less. The vessel may be designed to be vertical or horizontal in operation. In consideration of allowing the reduction of an installation area and exchanging the efficiency of the filtration membrane units, the vertical vessel (vertical shape) is preferably employed. The aspect ratio (value obtained by dividing height by width) when the vertical vessel is adopted is preferably over 1, further preferably 1.6 or more, and particularly preferably 1.8 or more. The upper limit is preferably 2.4 or less, further preferably 2.2 or less, and particularly preferably 2 or less.

To oily water separator 15 of the present embodiment, oil-containing produced water 20B is fed from a lower part of the vessel through feed line 15b (see feed direction $d_2$). The oil-containing produced water is introduced into vessel 15e constituting the body of equipment of oily water separator 15 to immerse the above-mentioned filtration membrane unit 80 with oil-containing produced water 20B. The rate of feeding the oil-containing produced water into the vessel is not particularly limited, while it depends on the size of the vessel or the like, the rate, in terms of a typical setup, is preferably 20 $m^3$/hr or more, and further preferably 50 $m^3$/hr or more. The upper limit is not particularly limited, but is preferably 300 $m^3$/hr or less, and further preferably 200 $m^3$/hr or less.

This filtration membrane unit is connected to treated water discharge line 15d, and treated water 20D which was filtrated is recovered therefrom. With regard to a differential pressure between the internal surface and the external surface of the filtration membrane as a driving force required for filtration in this case, a suction pump may be connected to the treated water discharge line to conduct filtration when necessary. However, in the present embodiment, the differential pressure is provided between pressure $P_1$ in the vessel and pressure $P_2$ on the treated water side, and thus treated water 20D is designed to be transferred. The pressure $P_1$ in the vessel is not particularly limited, but the pressure $P_1$ is preferably set up to be 0 to 10 $kg/cm^2G$, and further preferably 2 to 5 $kg/cm^2G$. The differential pressure ($P_1-P_2$) between the pressure in the vessel and the pressure on the treated water side is preferably set up to 0 to 5 $kg/cm^2$, and further preferably 0.2 to 1 $kg/cm^2$.

In the upper part (top portion) of the vessel, carrying-in and carrying-out opening $E_1$ (FIG. 1) is provided, and the vessel is formed such that the filtration membrane unit can be carried in and carried out therefrom. The size of the carrying-in and carrying-out opening is appropriately specified such that the filtration membrane unit to be used can be removed. In the lower part (bottom portion), manhole $E_3$ is provided, and the vessel is formed such that an operator can do work such as mounting and demounting of the filtration membrane unit placed therein (connection or release between a flange in an end portion of the returning line of the filtration membrane unit, and a flange of the treated water discharge line), or the like. Moreover, at the front of the vessel, manhole $E_2$ having a size large enough for a person to enter the vessel is provided in a similar manner and the operator can enter inside therefrom. $E_1$ to $E_3$ are designed to be sealed using lids, and the pressure state inside thereof is designed to be preferably maintained.

According to the apparatus relating to a preferred embodiment of the present invention, exchange of filtration membrane units can be made as described below. For example, in the upper part of the vessel of the oily water separator, on a side portion of the upper part of the vessel and/or in the lower part of the vessel, carrying-in and carrying-out opening $E_1$, manholes $E_2$ and $E_3$ are provided, respectively. When the filtration membrane unit is removed, the unit is demounted in the lower end portion of returning line 84 (FIG. 3) of the filtration membrane unit placed within the oily water separator. At this time, the connection is released between flange 85a provided in the lower end portion, and flange 85b of treated water discharge line 15d horizontally installed in the bottom portion of the vessel of the oily water separator. This release operation (demounting) can be performed by accessing the unit from manhole $E_3$. Meanwhile, the operator can enter the vessel from manhole $E_2$, put a chain on the buffer line of the demounted filtration membrane unit, and while the filtration membrane unit is lifted up, remove the unit from carrying-in and carrying-out opening $E_1$. With regard to the removed filtration membrane unit, a filtration membrane unit in which a new membrane module is installed in exchange of the deteriorated membrane module or the like, or a filtration membrane unit kept as a spare is separately prepared, and work reverse to the above-mentioned work in the method by which the unit is removed may be obviously performed. One of the advantages of the present invention is to allow exchange of the filtration membrane units in such a simple work.

Vessel 15e is not necessarily used under pressure, and does not need to have a structure or a material having a resistance to pressure. However, vessel 15e preferably is a pressure-resistant pressure vessel so as to withstand a rapid pressure rise upon the treatment of a fluid in which natural gas or the like is contained. In the oil-water separation according to the present invention, use in combination with an action of the pressure floatation separation is not precluded. In addition, as the shape of vessel 15e, an example of a capsule type (shape in which a body is cylindrical and upper and lower end portions are curved) is shown, but the present invention should not be interpreted as limited thereto. The curved surfaces in the upper and lower end portions preferably have a hemispherical or ellipsoidal shape bulging outward. For example, the shape may be formed into a rectangular parallelepiped shape or a dish shape in the upper and lower end portions. These shapes bring disadvantages from the view point of resistance to pressure, but enable an apparatus configuration which is morphologically fitted to a square or quadrangular filtration membrane module in a cross section.

On the other hand, when the vessel is used in a pressurized state, and exchange of the filtration membrane units is required, structure is presumed in which the vessel has a cylindrically-shaped body and a head is fixed at least at one end portion with flanges, and the head can be opened. However, when the inner diameter exceeds 3 m, for example, sealing of the flanges so as to avoid leakage of the fluid inside thereof is difficult in several cases. Moreover, assembly of lines of the discharge mechanism becomes complicated in several cases. When such points are taken into consideration, the vessel is preferably vertical.

Even if the vessel is horizontal, when the vessel is not used in the pressurized state, the vessel is formed into a rectangular parallelepiped shape and a structure is formed in which the upper surface can be opened, a problem of sealing is resolved. Moreover, the filtration membrane unit can be carried in and carried out from the upper part. In such a case, provision of a work space in the vessel is not needed.

(2) Filtration Membrane Unit

Filtration Membrane Unit

In oily water separator 15 of the present embodiment, a plurality of elongated filtration membrane units 80 are installed in parallel in alignment with the longitudinal directions thereof, and housed and placed in vessel 15e. Specifically, as shown in the cross section in FIG. 2-2, elongated rectangular parallelepiped filtration membrane units 80 are placed in alignment in which as many units as possible are placed relative to the circular cross section of the vessel. In the present embodiment, 19 filtration membrane units in total including 3, 4, 5, 4 and 3 units from above the drawing are placed in a hexagonal form in the cross section. This alignment form is not particularly restricted, but the disposition is preferably made in which as many filtration membrane units as possible are housed according to the form of the vessel.

Figure 3:
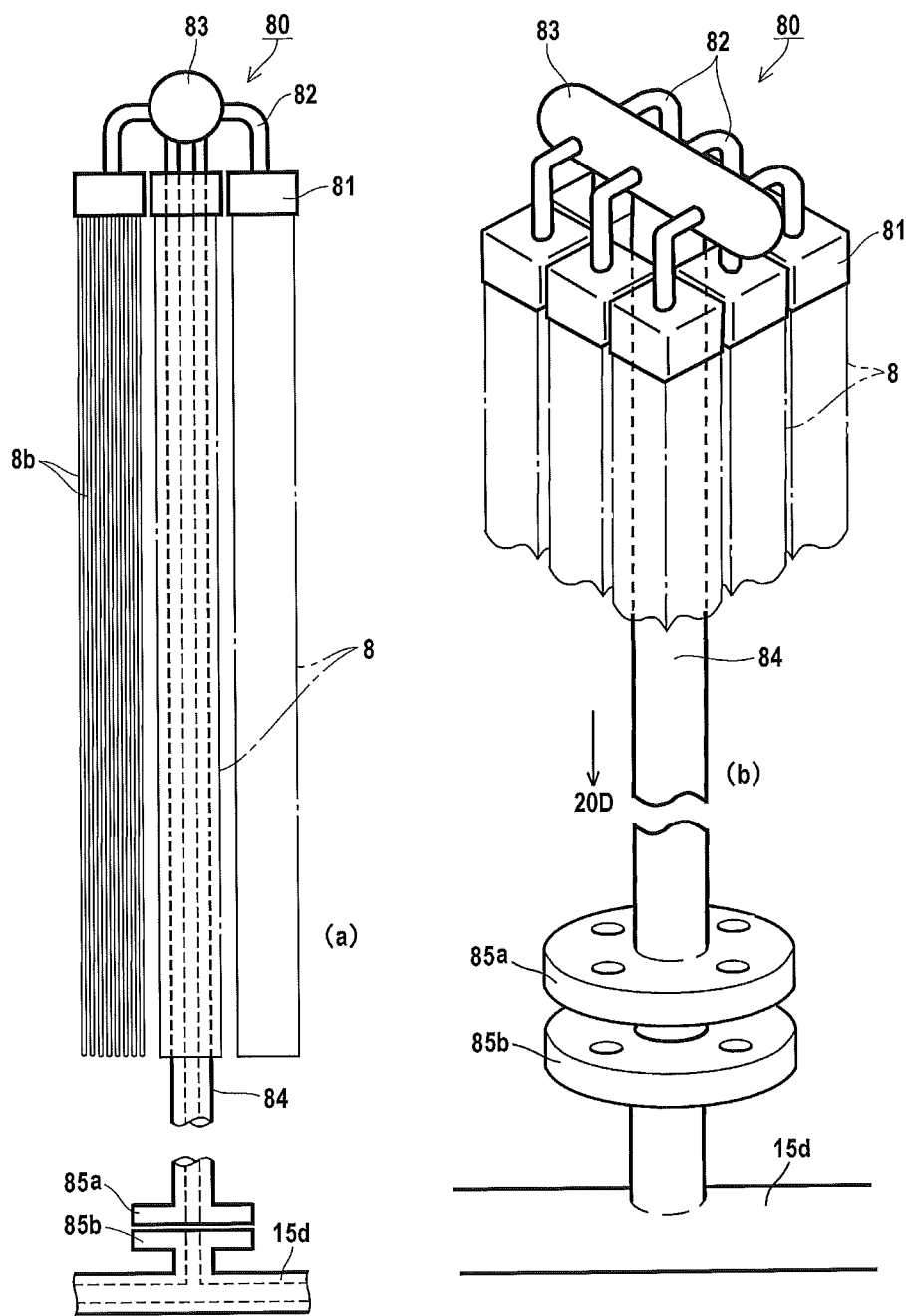
FIG. 3 is a side view (a) and a partially perspective view (b) of a filtration membrane unit as related to one embodiment of the present invention.

In the present embodiment, a plurality of filtration membrane modules (specifically, 8 units) 8 are assembled, and filtration membrane unit 80 is constituted (see FIG. 3). FIG. 3(*a*) is a side view of filtration membrane unit 80, and FIG. 3(*b*) is a partial perspective view (corresponding to the view III in FIG. 2-1). In the present embodiment, the above filtration membrane modules 8 are arranged in parallel and alignment in the longitudinal directions, and assembled. Further, the above filtration membrane modules 8 are connected to individual lines 82 by upper cap 81. As the individual lines 82 and the buffer line 83 in the upper part are communicatively connected, the oil-containing water filtered by means of the filtration membrane module (treated water) is flowing upward through individual lines 82 and collected into the buffer line 83. Collected treated water 20D is sent to a lower part of filtration membrane module 8 through communicatively connected returning line 84. In addition, in the present invention, individual lines 82, buffer line 83 and returning line 84 as described above are collectively referred to as a returning mechanism in several cases. The upper part herein means direction U in FIG. 2-1, and the height means a distance in this direction. The lower part means direction L in FIG. 2-1, and the depth means a distance in this direction. In vessel 15e, an end portion in the lower part is referred to as the bottom portion (Bt), and an end portion in the upper part is referred to the top portion (Tp) in several cases.

In the present embodiment, the filtration membrane unit is thus constituted by the plurality of membrane modules. At this time, as mentioned above, the treated water passes through the header lines (individual lines 82 and buffer line 83) above the membrane modules, and introduced into a lower direction through returning line 84 surrounded by each of the individual membrane modules. Thus, the treated water collected in the upper part is daringly introduced into the lower part and recovered to allow holding of a large space having only a limited amount of obstacles in removal space $S_2$ (FIG. 2-1) that spreads in the upper part of the filtration membrane unit. Lines and so forth to hinder work are not disposed in a random fashion, and thus if this filtration membrane unit is provided at a height that allows removal of this filtration membrane unit, favorable work of exchanging the filtration membrane units can be performed. Moreover, this returning mechanism can serve also as a function for supporting the filtration membrane module.

The number of filtration membrane modules constituting one filtration membrane unit is not particularly limited, but according to the present invention, the number is preferably 2 or more, further preferably 4 or more, and still further preferably 6 or more. The upper limit is preferably 24 or less, and further preferably 12 or less, in terms of ease of handling.

In the present invention, the returning mechanism or the discharge mechanism should not be interpreted as limited to the above-described form.

With regard to the embodiment of the returning mechanism, the relation of individual members is collectively described below. The returning mechanism in the filtration membrane unit as related to the present invention preferably has the upper cap, the individual line, the buffer line and the returning line, and is preferably communicatively connected with the plurality of the filtration membrane modules, respectively. The filtration membrane modules are preferably disposed in parallel and aligned in the directions of the opening portions of the filtration membranes. The upper cap and an upper sealing material to which the opening portions of the filtration membrane modules are fixed are preferably communicatively connected on one end. The upper cap and the individual line are preferably fixed and communicatively connected on an end on a side opposite to the end on which the upper sealing material and the upper cap are connected. The individual line and the buffer line are preferably fixed and communicatively connected on an end on a side opposite to the end on which the upper cap and the individual line are connected. The buffer line and the returning line are preferably fixed and communicatively connected on an end on a side opposite to the end on which the individual line and the buffer line are connected. The buffer line is preferably communicatively connected with the plurality of the individual lines, the returning line is surrounded by the plurality of filtration membrane modules and installed in a substantial center of the plurality of filtration membrane modules, the end on the side opposite to the end on which the returning line and the buffer line are connected is elongated in a certain direction of the upper sealing material, and on the end portion, the returning line preferably has a flange that can be fixed with any other line.

Filtration Membrane Module

Specific examples of filtration membrane module 8 include an elongated filtration membrane having one or two opening portions on the end portion. In the present embodiment, an example is shown in which filtration membrane module 8 has a plurality of elongated cylindrically-shaped filtration membranes (hollow fiber membranes or tubular membranes) 8b having two opening portions on both ends (see FIG. 4). Then, the opening portions are collected on one end of the filtration membrane module and fixed. In the present embodiment, the oily water separator has a differential pressure provision mechanism for generating a differential pressure between the outside and the internal space of the cylindrically-shaped filtration membrane to transfer the oil-containing produced water outside the cylindrically-shaped filtration membrane into the internal space by the differential pressure. At the time, filtration of oil-containing produced water 20B is performed by allowing the water 20B to pass through the cylindrically-shaped filtration membrane, and treated water 20D in which the oil concentration is reduced can be recovered from the internal space of the cylindrically-shaped filtration membrane. FIG. 5 is an enlarged side view in a view V in FIG. 4, and simultaneously schematically shows a state of transferring the oil-containing produced water. In the internal space q of cylindrically-shaped filtration membrane 8b, a suction force $w_2$ caused by a differential pressure is acting (see FIGS. 5, 6). Thus, the differential pressure is generated between the inside and the outside, and the oil-containing produced water is pushed thereinto from the outside ($w_1$). Upon this transfer to the inside, the oil-containing produced water is filtered to produce treated-water 20D having a low oil concentration. This treated water is transferred toward the returning mechanism ($d_6$) through opening portion 8c by the suction force.

Figure 4:
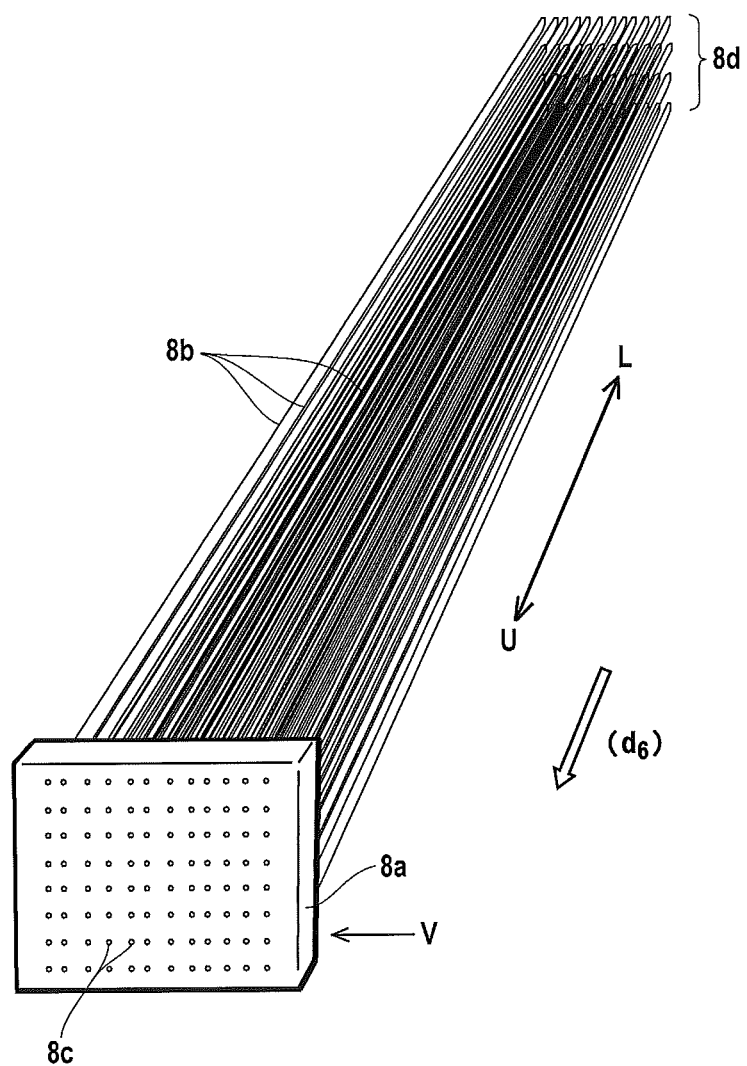
FIG. 4 is a perspective view of a filtration membrane module related to one embodiment of the present invention.
Figure 5:
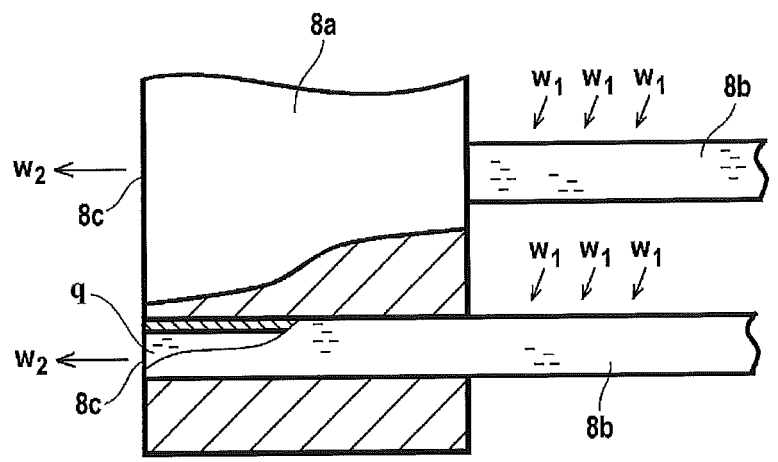
FIG. 5 is a partial cutaway side view (a) of a view V of the filtration membrane module shown in FIG. 4 and a cross-sectional view (b) showing a state of connecting an upper cap and an upper sealing material.
Figure 5:
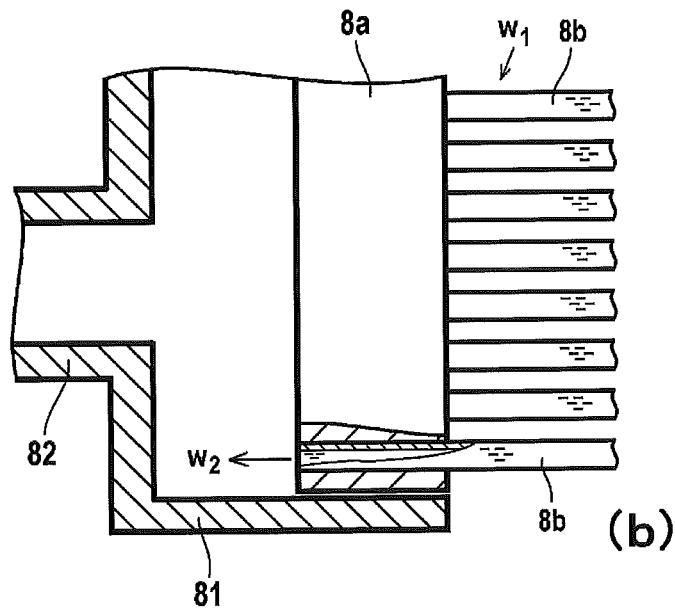

FIG. 4 shows the filtration membrane module adopted in FIG. 2 and FIG. 3 as a preferred embodiment of the present invention. In the present embodiment, one is adopted in which cylindrically-shaped filtration membrane 8b, such as hollow fibers shown in JP-A-2009-154032, is folded longitudinally on one end 8d. More specifically, the module has a structure in which thread-like or strap-like cylindrically-shaped filtration membrane 8b is formed into a U shape and folded. Accordingly, in filtration membrane module 8 of the form in FIG. 4, filtration membrane 8b is inserted into upper cap 8a about 5 to 10 cm from the end portion while filtration membrane 8b has an opening, and thus fixed thereto. A structure is formed in which opening portion 8c provided in upper sealing material 8a serves as an outlet of the treated water obtained by filtering the oil-containing produced water to recover the treated water. In filtration membrane module 8 in FIG. 4, linear alignment is to be maintained only by the weight of cylindrically-shaped filtration membrane 8b. However, when module 8 is placed toward a vertical direction within the vessel as shown in FIG. 2, a linear state is held by its own weight, and therefore a proper installation form is obtained. In the present embodiment, a structure is formed in which upper sealing material 8a is fitted into upper cap 81 to be communicatively connected with individual lines 82 by the upper cap (see FIG. 5(b)). In FIG. 5(b), a structure is shown such that cap 81 and individual lines 82 are continuous, but a structure may also be formed in which cap 81 and individual lines 82 in this part are screwed or engaged therein or sealed with a packing or the like. A structure of fitting upper sealing material 8a into upper cap 81 is not limited to the illustrated structure, and upper sealing material 8a and upper cap 81 may be sealed with a packing or the like, or may be screwed.

Moreover, the cylindrically-shaped filtration membrane is not limited to the structure in which the cylindrically-shaped filtration membrane is formed into the U shape and folded, and may have a structure with one opening portion on the end portion. Specifically, an I-shaped structure may be formed in which one opening portion is fixed with upper sealing material 8a, and the other end portion is blocked. The U-shaped one is preferably adopted in view of the positive swinging of a bundle of the hollow fiber membranes to allow the reduction of fouling on the membrane surface, and to allow the feeding of gas to be fed on the membrane surface from the lower part of the filtration membrane module.

In each example as described above, the number of the filtration membranes may be one, but a plurality of members may be applied, and the opening portions of the plurality of the filtration membranes are preferably collected and fixed at one end portion of the filtration membrane module.

The filtration membrane unit shown in FIG. 3 is fixed to the inside of the vessel by connecting flange 85a provided on a lower end of returning line 84 to be installed in a central portion of the filtration membrane unit in a form of being surrounded by eight units of filtration membrane modules 8, and flange 85b provided just below the returning line on an upper surface of treated water discharge line 15d that substantially horizontally passes through the bottom portion of the vessel. More specifically, a structure is formed in which the above-mentioned returning line 84 is connected, with the flanges, to treated water discharge line 15d that is horizontally installed on the bottom portion of the vessel, and thus filtration membrane unit is located the lower part of the vessel. Accordingly, the load of filtration membrane unit 80 is supported by treated water discharge line 15d. Treated water discharge lines 15d have a comb shape as shown in FIG. 2-2, and the returning lines of the filtration membrane unit adjacent to a direction of installing treated water discharge line are communicatively connected. Each of the end portions of the treated water discharge lines in the comb shape has a blind flange, and end portions opposite thereto are joined. More specifically, a preferred returning mechanism related to the present invention has the individual line communicatively connected with each filtration membrane module described above, and the returning line for sending the treated water downward through the buffer line. Further, the returning line is installed in the center of the plurality of the filtration membrane modules by being surrounded by the modules.

This filtration membrane is not necessarily cylindrically-shaped (hollow fiber membrane or tubular membrane), and may be flat membrane-shaped, but a cylindrically-shaped hollow fiber membrane is preferably adopted in view of capability of a further increase of membrane surface area per volume. "Flat membrane-shaped" herein refers to a module in which membrane elements prepared by fixing two sheet-shaped flat membranes in a parallel position by interposing a spacer are disposed at an equal interval, or a module in which passages of filtered water are provided inside a flat plate made from ceramics, and the passages are disposed at an equal interval, in which a gap between the flat membrane elements serves as a flow channel of a stock solution, and the filtered water is collected through the passages inside the flat membrane element.

In the present embodiment, to the immersed filtration membrane, specific operational procedures and so forth, a hitherto-known material or technique can be applied. For example, reference can be made to pages 39 to 49 in "Mijunkan no Jidai, Maku wo Riyoshita Mizusaisei" edited by Study Group on Water Treatment Technology using Membranes, the Japan Society on Water Environment, page 216 and the following pages, "Jyosuimaku (second edition)" edited by Editorial Committee on Water Purification Membrane (second edition), under supervision by Membrane Water Purification Committee, the Association of Membrane Separation Technology of Japan, the intermediate corporation having the limited liability, JP-A-S61-129094, or the like.

A material for forming the filtration membrane is not particularly limited, but in consideration of heat resistance and oil resistance, specific examples include a membrane made from PTFE (polytetrafluoroethylene) or ceramics as described above. In the present invention, above all, one made from PTFE is preferably used as the filtration membrane in view of high handling properties, reduction of weight, easiness on manufacture or maintenance or the like. In this respect, a proposal is made of using a cylindrically-shaped filtration membrane formed of a porous raw material and utilizing hydrophilicity and hydrophobicity to be applied to oil-water separation (see JP-A-2004-141753 or JP-A-2007-185599). However, whether or not the art can be applied to separation of the oil-containing produced water after the crude oil is removed is not demonstrated. If anything, use of the filtration membrane made from a synthetic polymer for the oil-containing water has been avoided so far (see page 88 in "Maku no Rekka to Fouling Taisaku" NTS (2008), and Patent Literature 2).

A mean pore size of the filtration membrane (for example, made from PTFE) is not particularly limited, but in consideration of filtration performance, the diameter is preferably 0.0001 μm or more, and further preferably 0.001 μm or more. If availability or the like is taken into consideration, the diameter is preferably 0.01 μm or more, further preferably 0.03 μm or more, and still further preferably 0.05 μm or more. The upper limit is preferably 1 μm or less, and further preferably 0.5 μm or less. Upon preparing one having a small pore size, the mean pore size is adjusted to be preferably 0.1 μm or less, further preferably 0.05 μm or less, and still further preferably 0.01 μm or less. In a shape of the hollow fiber membrane, the outer diameter is not particularly limited, but in consideration of a flow rate per volume and strength, the diameter is preferably set up to be 1 mm or more. The upper limit is set up to be preferably 4 mm or less, and further preferably 3 mm or less. From a similar viewpoint, the inner diameter is preferably 0.4 mm or more, further preferably 0.6 mm or more, and particularly preferably 0.8 mm or more. The upper limit is preferably 2 mm or less, further preferably 1.5 mm or less, and particularly preferably 1.2 mm or less. A thickness of the filtration membrane (for example, made from PTFE) is not particularly limited, either, but in consideration of filtration performance and strength in a similar manner as described above, the thickness is adjusted to be preferably 0.1 mm or more, further preferably 0.3 mm or more, and particularly preferably 0.5 mm or more. The upper limit is adjusted to be preferably 1.5 mm or less, and further preferably 1 mm or less.

An inner diameter of the tubular membrane is ordinarily 3 mm to 14 mm, and the upper limit is preferably 11 mm or less, and further preferably 8 mm or less. The lower limit is preferably 5 mm or more, and further preferably 7 mm or more. A thickness is preferably about 0.3 to 1 mm.

A length of the tubular membrane is not particularly limited, but is preferably elongated. As the hollow fiber membrane, for example, a length is preferably 50 cm or more, further preferably 90 cm or more, still further preferably 100 cm or more, and particularly preferably 120 cm or more. The upper limit is preferably 1,000 cm or less, further preferably 500 cm or less, still further preferably 400 cm or less, still further preferably 300 cm or less, still further preferably 230 cm or less, still further preferably 210 cm or less, and particularly preferably 200 cm or less.

A length of the filtration membrane module is preferably 20 cm or more, further preferably 40 cm or more, still further preferably 80 cm or more, and particularly preferably 100 cm or more. The upper limit is preferably 500 cm or less, further preferably 450 cm or less, still further preferably 400 cm or less, and particularly preferably 300 cm or less.

As a commercial item of the hollow fiber membrane, POREFLON (registered trademark) manufactured by Sumitomo Electric Industries, Ltd., or the like can be used.

In the present embodiment, a filtration membrane that is excellent in heat resistance, as made from PTFE, can be preferably adopted, and therefore the present invention also has an advantage of no need of cooling the produced water (20B in FIG. 1) to be treated.

The filtration membrane may be mono-layered or multi-layered in two or more layers. As a multi-layered hollow fiber membrane, membranes having different mean pore sizes can also be used for the inner layer, the outer layer or the intermediate layer, respectively. For example, reference can be made to JP-A-2004-141753, JP-A-H4-354521, JP-A-H3-109927, or the like.

Method for Measuring a Mean Pore Size

Measurement of the mean pore size can be carried out by a usual method. For example, evaluation can be made using the following mean flow pore size. The measurement was carried out using PermPorometer CFP-1500A (manufactured by Porous Materials, Inc.), and as a liquid, using GALWICK (propylene, 1,1,2,3,3,3-oxidized hexahydrofluoric acid) (manufactured by Porous Materials, Inc.). Specifically, the mean pore size can be determined as described below. First, measurement is carried out on a relationship between differential pressure applied to a membrane, and an air flow rate permeated through the membrane in the cases where the membrane is dry and where the membrane is wet with the liquid, and graphs obtained are taken as a dry curve and a wet curve, respectively. Differential pressure at a point of intersection between a curve obtained by halving the flow rate in the dry curve, and the wet curve is taken as (half-dry air pressure) P(Pa). The mean flow pore size is determined according to the equation described below.

Mean flow pore size $d(\mu m) = c\gamma/P$

Here, c is a constant and 2,860, and γ is a surface tension (dynes/cm) of the liquid. Unless otherwise noted, measurement temperature is set to 25° C., and a pressure rising rate is set to 1 kPa/second. For other detailed procedures and so forth, reference can be made to the specifications in ASTM: F316-03.

Method for Measuring a Dimension

A film thickness, an inner diameter and an outer diameter of the cylindrically-shaped filtration membrane (hollow fiber membrane) can be determined by slicing the membrane in a radial direction with a fine cutter, and observing the cross section thereof by a microscope (scanning electron microscope). Sampling is performed in the cross section in five places, and the mean value is adopted. Measurement is to be carried out in accordance with section 5.4. "Optical method" in JIS K5600-1-7: 2014 for detailed conditions.

(3) Discharge Mechanism

In the present embodiment, the returning line is connected, in the lower part of the vessel, to the treated water discharge line for sending the liquid to outside of the vessel. The discharge line is designed so as to have strength to sufficiently support the weight of the filtration membrane unit per se that is fixed thereto, and a load upon filtering the oil-containing water and passing the filtered water through the inside of the line. Moreover, a suction pump may be provided downstream of the line as a differential pressure provision mechanism of treated water discharge line, but when the pressure inside the vessel is high enough to discharge the treated water from the treated water discharge line, provision of the suction pump is not needed. In addition, the present invention should not be interpreted as limited to the illustrated discharge mechanism (treated water discharge line 15d or the like), as mentioned above. More specifically, the discharge mechanism means a structure as a whole for discharging a treated liquid or the like to the outside of the vessel, and within the range in which the advantageous effects of the present invention are produced, every means that are adopted by those skilled in the art can be preferably applied. For example, in the form shown in FIG. 2-2, a structure is formed in which the treated water is collected for each row of the filtration membrane unit, discharged from one place to outside of the vessel, and further collected into one and then discharged, but the discharge mechanism is not limited to this form.

(4) Gas Bubble Generation Means

In oily water separator 15 of the present embodiment, gas diffuser 16 as a gas bubble generation means is introduced inside the vessel. This gas diffuser 16 is disposed so as to be immersed into the oil-containing produced water, and placed below filtration membrane unit 80 (filtration membrane module 8) in the vertical direction. Then, a predetermined gas is fed into this gas diffuser from gas header 19 such as a gas cylinder through gas feed line 15a (see feed direction $d_3$) to generate gas bubbles 53 toward the filtration membrane module. At this time, the gas inside the vessel may be recovered and circulated through circulation blower 56 (gas circulation means: circulation blower 56, circulation flow line 17), and forwarded to gas diffuser 16 again to generate gas bubbles 53 in the oil-containing produced water. In order to prevent penetration of oxygen in the air into the vessel or in order to circulate the generated gas in the vessel so as to prevent emission of a hydrocarbon-containing gas to the atmosphere, vessel 15e to be used in oily water separator 15 has an airtight structure. Specifically, in the present embodiment, the gas generated inside vessel 15e is designed so as to be returned again to the gas diffuser through circulation flow line 17.

Figure 6:
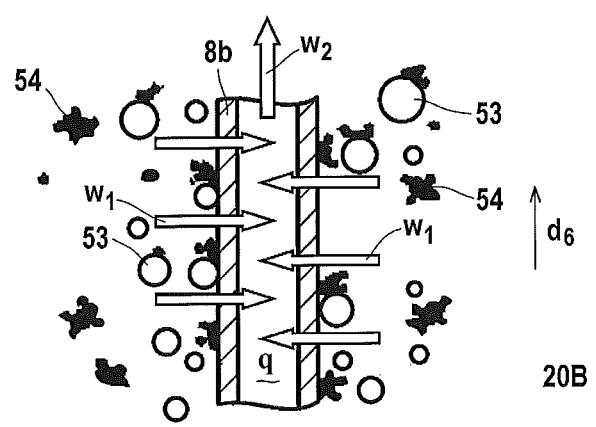
FIG. 6 is an enlarged explanatory drawing showing of a filtration mechanism of a filtration membrane and a purification mechanism by gas bubbles.

A state in which the gas bubbles act on the filtration membrane is further described using the enlarged view shown in FIG. 6. In filtration membrane module 8 of the present embodiment, a plurality of cylindrically-shaped filtration membranes 8b are installed inside the module such that the longitudinal directions are aligned in the vertical direction. Gas bubbles 53 generated in the oil-containing produced water rise in oil-containing produced water 20B inside the vessel toward direction $d_6$ against gravity. At this time, oil 54 contained in the oil-containing produced water also has a specific gravity lower than water, and therefore tends to rise. However, the oil contains one having a slightly higher specific gravity, one formed into fine liquid droplets and emulsified into the oil, and a component that is dispersed into the oil-containing produced water and floats in the oil. The above-described gas bubbles 53 are adsorbed onto this floating oil 54 to have an action of instantaneously raising oil 54 toward a side of liquid surface s (FIG. 2). Further, in the present embodiment, gas bubbles 53 are generated toward the surface of cylindrically-shaped filtration membrane 8b, and therefore gas bubbles 53 exhibit an action of scouring oil 54 attached to the surface of the cylindrically-shaped filtration membrane from the surface of the cylindrical-shaped filtration membrane during the progress of the filtration to raise oil 54 toward liquid surface s in a similar manner as described above. In combination with the actions described above, even if the oil-containing water is continuously filtered by means of cylindrically-shaped filtration membrane 8b, the surface of the cylindrically-shaped filtration membrane is cleaned, good filtration performance is continued, and efficient recovery of the treated water as describe later can be realized. An amount of feeding the gas bubbles is not particularly limited, but is preferably set to 50 L/min or more and 100 L/min or less per membrane module. In the case where the amount of feeding the gas bubbles is adjusted in this range, an effective cleaning effect of the filtration membrane can be obtained, and such a case is preferred. The diameter of the gas bubble suitable for scouring the oil is preferably about 0.5 to 30 mm. The diameter of the gas bubble suitable for being adsorbed onto the oil to raise the oil to liquid surface s is preferably 1,000 μm or less, and more preferably 200 μm or less.

A gas component for forming the gas bubbles is not particularly limited, but is preferably nitrogen or natural gas. At this time, in the present invention, pressure $P_1$ inside the vessel is set up lower than flow pressure $P_3$ of the oil-containing produced water before being fed into the vessel to foam the component dissolved in oil-containing produced water 20B by the differential pressure ($P_3-P_1$), and the resultant foam may be utilized as the above-mentioned gas bubbles 53. Specific examples of such a foaming component include the natural gas contained in the oil-containing produced water. The above-described differential pressure ($P_3-P_1$) is not particularly limited, but is preferably set up to be 0 to 5 kg/cm², and further preferably 1 to 3 kg/cm². As the gas component for forming the gas bubbles, no oxygen is preferably used so as to prevent ignition in contact with an organic component inside the vessel or prevent corrosion of a metal part. In order to generate the above-described gas, a pressure adjustment means may be installed inside the vessel. An operation is also preferred in which the pressure inside the vessel is reduced by the pressure adjustment means to foam the gas contained in the oil-containing water, and to generate the gas bubbles in the oil-containing water.

(5) Mechanism for Recovering a Liquid with a High Oil Concentration

Figures 1, 7:
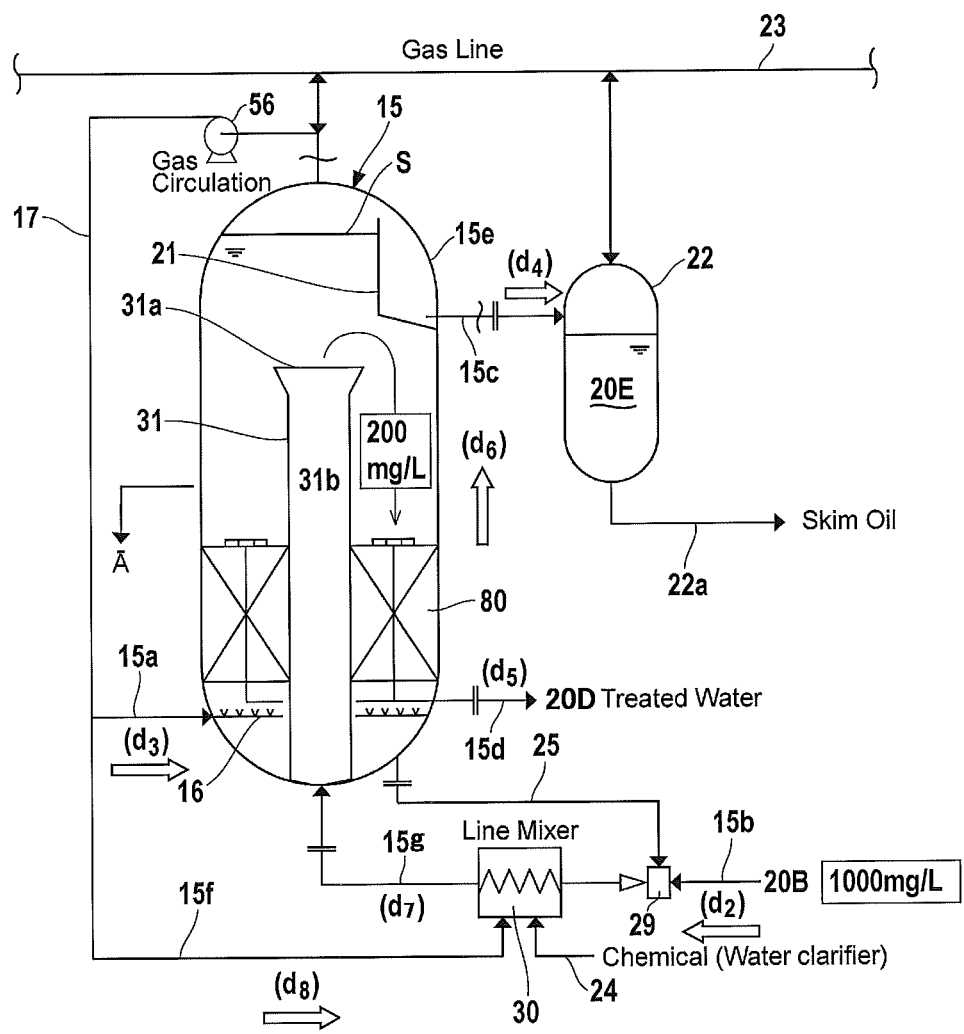
Figures 2, 7:
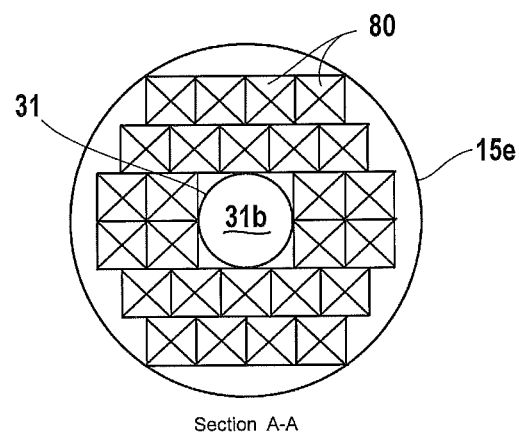
Figures 3, 7:
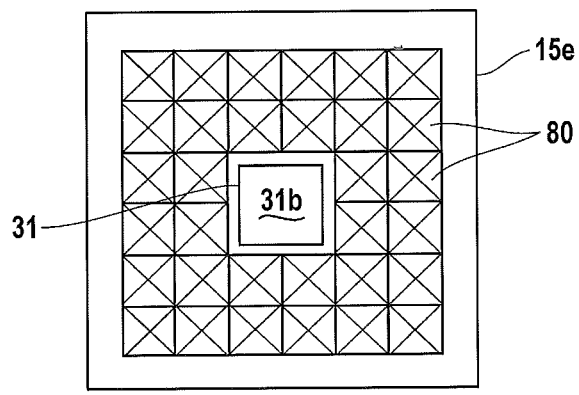
Figures 4, 7:
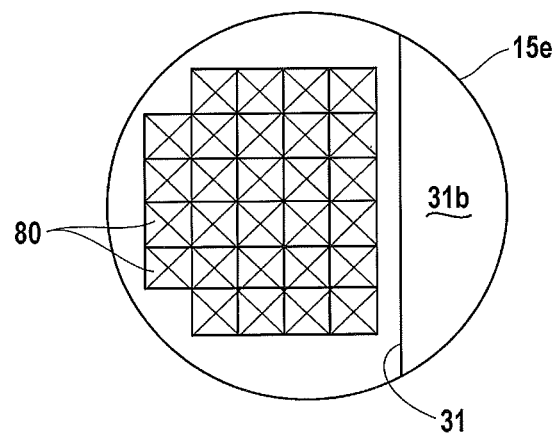

Oily water separator 15 of the present embodiment is further provided with a cylindrically-shaped or box-shaped mechanism (oil skimmer) for recovering a liquid with a high oil concentration, in order to recover the highly concentrated oil, in a position of liquid surface s of oil-containing produced water 20B. Oil skimmer 21 is fixed with a supporting rod suspended by means of supports 21c from the top portion of vessel 15e. As any other shape, as shown in FIG. 7-1, a structure may be formed in which the oil skimmer is attached to an inner wall of the vessel. This oil skimmer 21 is constituted of partition wall 21a and bottom plate 21b, and skimmed oil 20E, which is oil-containing produced water overflown into inside of the partition wall (skimmed by the partition wall of the oil skimmer) is stored inside the skimmer. As mentioned above, in the present embodiment, together with a spontaneous rise of the oil, the oil rises toward liquid surface s accompanying the gas bubbles. Thus, the oil concentration in the oil-containing produced water in vessel 15e becomes higher as the produced water comes closer to the side of the liquid surface, namely, more upward in the vertical direction. On the other hand, oil-containing produced water 20B is continuously fed into the vessel from oily water feed line 15b, and then the contained oil floated on the liquid surface overflows partition wall 21a into the oil skimmer. Thus, the skimmed oil 20E collected in the oil skimmer 21 is recovered through skimmed oil discharge line 15c (see direction $d_4$). This liquid with a high oil concentration may be returned to HP separator 2. More specifically, a returning means for returning the liquid on or near the liquid surface of the oil-containing water with a high oil concentration flown over the partition wall so as to join with the crude oil fluid mixture is preferably provided. The size of oil skimmer 21 is not particularly limited, in view of sufficiently securing a removal space as described later, a volume is preferably secured in which the liquid with a high oil concentration can be sufficiently recovered and discharged to an outside of the system.

In the present embodiment, the gas bubble generation means and the mechanism for recovering the liquid in a high oil concentration are adopted as described above, and therefore the present invention has advantages as described below. The filtration membrane is cleaned, and simultaneously the oil in the oil-containing water rises toward the liquid surface by the rise of the gas bubbles. Thus, the oil concentration is increased on or near the liquid surface. Meanwhile, the oil-containing produced water is continuously introduced into the vessel, and the highly concentrated liquid that becomes a surplus and goes over the partition wall by an increase or decrease of the surface can be recovered.

The partition wall or the bottom plate of the oil skimmer preferably has a plate shape having no pores so as to prevent the oil from being permeated. In addition, FIG. 2-1 shows a drawing in which skimmed oil discharge line 15c elongated downward from the oil skimmer is extended to removal space $S_2$. However, the diagram is shown only for convenience of illustration, and skimmed oil discharge line 15c is disposed such that line is laterally elongated just below the oil skimmer, does not enter the removal space, and has no hindrance in exchange of the filtration membrane units.

In the present invention, the recovery mechanism is not limited to the above-described embodiment, and within the range in which the advantageous effects of the present invention are produced, a mechanism in any form can be preferably adopted. For example, in FIG. 7-1, the recovery mechanism has a structure in which skimmed oil accumulated in the oil skimmer can be extracted from line 15c provided on a side surface of the vessel. In the apparatus in FIG. 7-1, the recovery mechanism is mounted on a part of the inner wall of the vessel, but may be provided on an entire peripheral surface of the inner wall. The apparatus in FIG. 7-1 has a riser pipe described later in a substantially center, and therefore an installation of the recovery mechanism on the side surface of the vessel is preferred to the installation thereof above a riser pipe in view of capability of preferably discharging the waste liquid. Moreover, a line may be disposed near or below liquid surface s to suction and recover the oil-containing produced water in the vicinity of the liquid surface therefrom. Alternatively, the mechanism may be a reservoir in a structure floating on liquid surface s, and having a structure in which the highly concentrated oil is laterally recovered into the reservoir from the vessel.

(6) Removal Space

In oily water separator 15 of the present embodiment, removal space $S_2$ serving as a work space for removing the filtration membrane unit is formed above a space inside which the filtration membrane unit is placed. FIG. 2 shows this removal space as distance $S_2$ in a height direction, but the diagram is shown only for convenience of illustration, and a space within a width inside the vessel is defined as the removal space. As mentioned above, the removal space is designed such that an operator can enter the vessel. One unit of the filtration membrane module has a weight of about 10 to 20 kg, and even when 8 units are combined to form the filtration membrane unit, one unit has a weight of 150 to 200 kg. Accordingly, exchange work can be easily performed using a chain block or the like.

Figure 9:
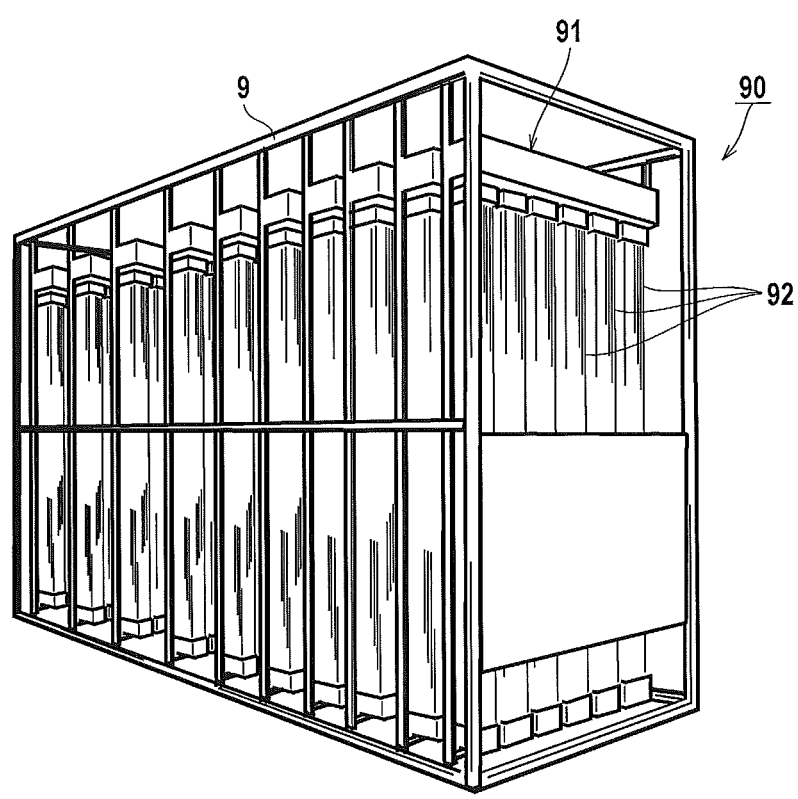
FIG. 9 is a side view schematically showing a filtration membrane unit applied to a conventional oily water separator.

FIG. 9 is a perspective view showing an embodiment in which a plurality of filtration membrane units 92, which are preferably applicable to a cylindrical and horizontal vessel, are mounted on skid frame. The filtration membrane units are supported with a box-shaped skid structure (skid frame) 9. The skid frame 9 is designed so as to be applied to the work of placing filtration membrane unit 90 inside the vessel by opening the head of the vessel and horizontally moving the unit laterally therefrom. As the structure thereof, 10 rows of sub-units 91 are installed inside skid frame 9 made of iron. In one sub-unit, 6 units of filtration membrane modules 92 are disposed. The skid frame having the strength to withstand a horizontal movement of the entire unit to allow stable installation is required, and thus this unit becomes naturally heavy. In one example, the weight of the filtration membrane unit becomes 2,000 kg. In order to move this unit, a dedicated heavy machine is required. In such a case, a connection between the returning line of each filtration membrane unit and the line of the discharge mechanism, or assembly between the line of the gas feed lines and the skid frame becomes complicated in several cases.

According to the preferred embodiment of the present invention, in the case that the filtration membrane unit is installed inside the vessel, the filtration membrane can be installed one by one through the carrying-in and carrying-out opening, and as mentioned above, the operator can exchange the units by a human hand or a simple implement. Moreover, equipment such as a heavy machine becomes unnecessary, and the weight of the filtration membrane unit becomes light, and therefore an effect on reducing cost and a load in management is also significantly large.

In the present embodiment, as mentioned above, a system is adopted in which, in order to avoid taking a line space above the space in which the filtration membrane unit is placed, the treated water filtered by means of the filtration membrane module is discharged through the returning mechanism to the outside of the oily water separator from the treated water discharge line installed below the filtration membrane unit, and therefore securing of the removal space broadly above the filtration membrane unit is realized. Moreover, complication of assembly with the lines of the gas feed means can be resolved. Thus, securing of the space without obstacles not only improves the working efficiency of the operator but also significantly improves the safety of the work.

The removal space is preferably placed below the mechanism (oil skimmer) for recovering the liquid with a high oil concentration. In relation to a pressure-resistant shape of the vessel, a part having a curvature in the upper part (top portion) is further preferably secured below the tangent line (a boundary line between a curved-line portion and a straight-line portion, of a head and the like) of the vessel. Such configuration is preferred because the filtration membrane unit can be removed without contact with the mechanism for recovering the liquid with a high oil concentration and without interference with the top portion upon withdrawing the filtration membrane unit in the end. Alternatively, if a structure is formed in which the oil skimmer and the associated lines can be detached, these are detached upon exchanging the filtration membrane units to allow an improvement in the working efficiency, and such a structure is preferred.

In the present embodiment, height $S_2$ (or $S_1$) of the removal space is set up to be substantially identical with or larger than height ($S_3$) of the filtration membrane unit. Such a setup is preferred because the exchange work can be performed by completely withdrawing the filtration membrane module. Use of "substantially" herein means that no strict relation of 1:1 in length is required, and if no hindrance is caused on the work of exchanging the filtration membrane units, the height may be sufficient. Height $S_2$ (or $S_1$) of the removal space is preferably 1 or more times as high as height $S_3$ of the filtration membrane unit, and further preferably 1.1 or more times as high as height $S_3$. The upper limit is not particularly limited, but in consideration of a realistic height of the vessel, the height is preferably 3 times or less times as high as height $S_3$ of the filtration membrane module, and particularly preferably twice or less times as high as height $S_3$.

(7) Others

In the present embodiment, a coalescer packed with a spherically-shaped packing material made from a resin, for example, may be installed in the lower part of vessel 15e. In the configuration shown in FIG. 2, this coalescer 18 is installed in a position below gas diffuser 16. Installation of such coalescer 18 allows agglomeration of dispersed fine oil before oil-water separation to significantly increase a particle diameter, and thus improvement can be expected in a floatation separation effect by the gas and an oil rejection on the surface of the filtration membrane.

(Reduction of Decrease in Flux)

In general, with regard to membrane separation (filtration), there are concerns about a decrease in flux by fouling on the surface of the filtration membrane. In contrast, according to the oily water separator related to the preferred embodiment of the present invention, a raw material that is hard to cause fouling, such as the filtration membrane made from polytetrafluoroethylene (PTFE), can be applied, and the surface of the filtration membrane can be continuously cleaned by the gas bubbles of the natural gas or the like. Further, if back washing is performed on a regular basis, as described in the examples below, a decrease in flux can be significantly suppressed.

Moreover, in the case where filtration by cross flow according to an external pressure type is performed using the PTFE membrane, and the back wash is performed for 10 seconds every 30 minutes, but no continuous cleaning on the surface of the filtration membrane by the gas is performed, a change over time of the flux is shown in FIGS. 5(A) to 5(C) in WO-A-2011/101961. However, the flux is stabilized after 6 hours from the beginning, but a large decrease in the flux is observed in an early stage. According to the preferred embodiment of the present invention, the filtration can be performed according to an immersion type, under a low differential pressure operation, and constant cleaning on the surface of the filtration membrane by the gas can be performed, and therefore the decrease in the flux in the early stage can also be suppressed at a low level.

(8) Rising Flow Channel (Riser Pipe)

FIG. 7-1 is a sectional side view schematically showing an oily water separator related to another preferred embodiment according to the present invention. FIG. 7-2 is a cross-sectional view in a view A of the oily water separator in FIG. 7-1. First, to schematically describe an embodiment thereof, rising flow channel (riser pipe) 31 of the oil-containing water is installed inside vessel 15e into which the above-mentioned oil-containing water is introduced. Vessel 15e is equipped with oil skimmer (recovering mechanism) 21, in the upper part thereof, for flowing an excess liquid with a high oil concentration to the outside, and in the lower part of vessel 15e, filtration membrane unit 80 equipped with an immersion type filtration membrane module is mounted. In the oily water separator of the present invention, the oil-containing water subjected to floatation separation treatment in riser pipe 31 and having a decreased oil concentration is led to the filtration membrane in a downward flow. As a result, further efficient oil removal can be performed with further satisfactory operation management properties. In FIG. 7-1, assembly of the riser pipe is assumed in a position of a principal portion VII of the conventional oil-water separation system in FIG. 10, in place of a system thereof. Description is partially omitted for each member and structure in FIG. 7-1, but ones having signs identical with the signs of each member and structure of the oily water separator in the form shown in FIG. 2-1 mean that the separator has an identical function and structure. A coalescer having a honeycomb structure may be installed in an upper end portion of riser pipe 31.

In the present embodiment, the vessel is provided with a means for leading, to drain line 25, the concentrated water (oil-containing water containing SS with high concentration) led to the bottom portion of the vessel, and sending the concentrated water to eductor 29. According to the means, the highly concentrated oil, SS or the like settled in the bottom portion is led again to mixture feed line 15g, and recycled, and thus can be finally discharged to the outside of the system through discharge mechanism 21. Moreover, the vessel has gas diffuser 16 for feeding the gas bubbles to the lower part of the filtration membrane. This form is similar to the embodiment in FIG. 2. Further, the riser pipe 31 is connected to the feed line of the oil-containing water in the bottom portion of the vessel. Inside this riser pipe, the gas bubbles together with the oil-containing water can be fed through gas feed line 15*f* (direction of flow $d_8$). An amount of feeding the gas bubbles into the riser pipe is appropriately specified depending on an oil concentration and an SS concentration of the target oily water, and throughput thereof per oily water separator. A preferred range of the amount of feeding the gas bubbles onto a side of the filtration membrane is similar to the range described above. The gas forming the gas bubbles may be recycled from the inside of the vessel, but may be fed from gas header line 23.

From a bottom portion of the riser pipe, oil-containing produced water 20B is fed into the vessel. In the present embodiment, a chemical to be fed from chemical feed line 24 of the chemical through line mixer 30 is designed to be fed into the vessel in a state in which the chemical is mixed with the gas bubbles (mixture feed line 15*g*, direction of flow $d_7$). The oil-containing water in the riser pipe rises, and is discharged into the vessel in pipe outlet 31*a*. At this time, the highly concentrated oil has a low specific gravity and is transferred in a rising direction, and recovered in recovering mechanism 21. On the other hand, a component in which the oil is reduced and gently settles is transferred toward filtration membrane unit 80 while moving downward. As a result, the oil-containing water with a comparatively low concentration reaches filtration membrane unit 80, and is filtered in this part.

Specific examples of the chemical include various kinds of agglomerating agents, an emulsion breaker or a chemical referred to as a water clarifier. Thus, the highly concentrated oil can be further efficiently sent to recovering mechanism 21, and further efficient oil-water separation within the vessel can be performed. Specific examples of the gas to be fed into the riser pipe include nitrogen and natural gas. A line for feeding the chemical into the apparatus in FIG. 2-1 is not shown, but the chemical is preferably mixed into the oil-containing water to be introduced into the vessel through line 15*b*.

In the present embodiment, the highly concentrated oil recovered in the above-described oil skimmer (recovering mechanism) 21 is recovered into recovery pot 22 through skimmed oil discharge line 15*c* (direction of flow $d_4$). Then, the oil is disposed of outside of the system through line 22*a*, or again delivered for oil-water separation treatment. Thus, recovery pot 22 is adopted and the present invention has an advantage of preventing a problem of blowout of the gas accumulated in the upper part of vessel 15*e* to allow stable discharge of the highly concentrated oil. In addition, recovery pot 22 is not shown in FIG. 2-1, but recovery pot 22 is preferably applied also to the apparatus shown in FIG. 2-1.

In the present embodiment, pipe outlet 31*a* is disposed in a position (direction of a water surface) higher than a position of filtration membrane unit 80. Such a disposition is preferred because the highly concentrated oil can be transferred to a place above the filtration membrane unit, and the oil-containing water having oil with a comparatively low concentration can be fed into the filtration membrane. The dimension of the riser pipe is not particularly limited, but a height thereof is preferably 60% or more of the height of vessel 15*e*, and further preferably 80% or more thereof. The module preferably has a structure in which the bottom portion of the riser pipe is placed in the bottom portion of the vessel to feed oil-containing produced water 20B into the vessel therefrom. However, even if the oil-containing water is not fed into the vessel from the bottom portion, the oil-containing water may be introduced into the vessel from the lateral direction in the lower part of the vessel, and may be designed to flow into the pipe internal 31*b*. The fluid velocity in the riser pipe is preferably 0.1 m/s or more, and further preferably 0.15 m/s or more. The upper limit is preferably 0.5 m/s or less, and further preferably 0.3 m/s or less. A space velocity inside the riser pipe is preferably 240 $hr^{-1}$ or less, and further preferably 120 $hr^{-1}$ or less. Moreover, the lower limit is not particularly limited, but is preferably 40 $hr^{-1}$ or more, and further preferably 60 $hr^{-1}$ or more.

The riser pipe 31 is not limited to one having a round cross section, but may be one having a square shape. Alternatively, the riser pipe 31 may be a flow channel obtained by appropriately partitioning a part inside the vessel. FIG. 7-3 shows an example in which a square-shaped vessel is used, and FIG. 7-4 shows one in which a part inside the vessel is partitioned to form a rising flow channel in a side of the vessel. Moreover, a plurality of rising flow channels such as the riser pipes may exist within the vessel or an inside of the channel may be partitioned. In addition, the rising flow channel of the oil-containing water is meant to include the riser pipe, and also a pipe (tube)-shaped flow channel, and further a flow channel formed by partitions.

An advantage of the oily water separator of the present embodiment is further described. In the treatment scheme (FIG. 10) according to the conventional method, as mentioned above, the oil-containing water is fed into an induced gas floatation oil-water separation apparatus after the hot produced water at about 120° C. was cooled by heat exchanger 51*a*. Therefore, a fouling problem in heat exchanger 51*a* for the cooling has frequently occurred. In contrast, in the apparatus related to the preferred embodiment of the present invention as shown in FIG. 2 or FIG. 7, the heat exchanger and a tank for accumulating the cooled produced water become unnecessary. Moreover, the driving force of filtration may be a differential pressure of about 0.5 $kg/cm^2$, and a pump is not always required, and power consumption is significantly reduced.

Further, in the form shown in FIG. 7, a system is applied in which the riser pipe 31 for floatation separation is assembled inside the vessel, and waste water subjected to the floatation separation is fed into the filtration membrane in the downward flow. Thus, the oil-containing water fed from the bottom portion, for example, at 1,000 mg/L, is discharged from pipe outlet 31*a*, the oil-containing water in which the oil concentration is decreased to about 200 mg/L by the floatation separation moves downward. FIG. 7 shows an aspect using a boxed numerical value of concentration. This oil-containing water is to be fed into the filtration membrane, and thus fouling caused by the oil is significantly decreased in comparison with the case where the oil-containing water having 1,000 mg/L is directly fed into the filtration membrane. As a result, a high flux and oil removal at a high efficiency can be expected.

In addition, treatment capacity of the apparatus as related to the present embodiment should not be interpreted as limited thereto by the description.

EXAMPLES

The present invention will be described in more detail based on examples given below, but the invention is not meant to be limited by these.

An oil-water separating performance test was conducted by a filtration system for testing. The test membrane (hollow fiber membrane) used was made from PTFE having a mean pore size of 0.1 μm, an outer diameter of 2.7 mm and an inner diameter of 1.3 mm and subjected to hydrophilic treatment with cross-linked PVA (polyvinyl alcohol), in which porosity was adjusted to 65% and tensile strength (at 25° C.) to 50 to 80 N. The membrane area was 0.089 m², and the upper seating material was a heat-resistant epoxy resin. This hollow fiber membrane was assembled into the filtration system as a membrane module. Oil-containing produced water obtained from an operation site of Canada Oil Sands Limited was charged into an oil-containing waste water reservoir (raw water tank), and temperature was adjusted to 60° C. Pulsed back wash by jetting of air every 15 minutes was performed, back pressure (internal pressure) was applied to the membrane module to sweep away a solid content or the like deposited on the surface of the filtration membrane.

Figure 8:
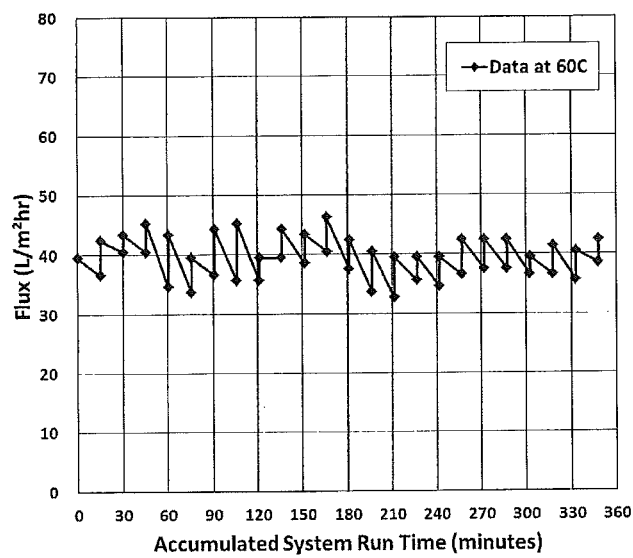
FIG. 8 is a graph showing the results of the filtration experiments conducted in Examples.

When an operation was performed according to the conditions described in "Table A" below, a stable filtration flow rate as shown in FIG. 8 was obtained. No decrease in the filtration flow rate was observed even after 6 hours from the start of the experiment, and the flow rate kept a value equivalent to the value at the start of the experiment. Good results as high as 99.4% or more in the oil rejection equal to the performance of the current oil-water separation facilities were obtained. Moreover, as shown in FIG. 8, the flux hardly decreased during the experiment by performing a back wash operation in a short period of time on a regular basis.

TABLE A

| Filtration inlet pressure | 50 kPaG |
|---|---|
| Filtration outlet pressure | 0 kPaG |
| Temperature of charging oil-containing produced water | 60° C. |
| Frequency of back wash | Once/15 minutes |
| Back wash pressure | 1.38 MPa |
| Back wash apparatus | Mempro (registered tradename) BACKPULSE |

When the oil concentration (concentration of petroleum-based hydrocarbon) of the fed oil-containing produced water was 700 ppm in the raw water, the oil concentration in the filtrate permeated through the membrane module decreased to 3 ppm or less, and the rejection was 99.6%. In addition, the results when the charging temperature was 80° C.: the oil concentration in the filtrate; 4.58 ppm, and the rejection; 99.4%. Moreover, the results when the charging temperature was at 40° C. were: the oil concentration in the filtrate: 3.50 ppm and the rejection: 99.5%.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2014-188019 filed in Japan on Sep. 16, 2014 and Patent Application No. 2013-238063 filed in Japan on Nov. 18, 2013 and, which are entirely herein incorporated by reference.

REFERENCE SIGNS LIST

1 Oil Well
2 HP Separator
3 LP Separator
4 Dehydrator
5 Skim Tank
6 Induced Gas Flotation
7 Oil Removal Filter
8 Filtration Membrane Module
8a Upper Sealing Material
8b Cylindrically-Shaped Filtration Membrane
8c Opening Portion
10 Oil-Water Separation Apparatus
15 Oily Water Separator
15a Gas Feed Line
15b Oily Water Feed Line
15c Skimmed Oil Discharge Line
15d Treated Water Discharge Line
15e Vessel
15f Gas Feed Line
15g Mixture Feed Line
16 Gas diffuser
17 Circulation Flow Line
18 Packing Material
19 Gas Header
20A Crude Oil Fluid Mixture
20B Oil-containing produced water
20D Treated Water
20E Skimmed Oil
21 Oil Skimmer
21a Partition Wall
21b Bottom Plate
21c Support
22 Recovery Pot
23 Gas Header Line
24 Chemical Feed Line
25 Drain Line
29 Eductor
30 Line Mixer
31 Rising Flow Channel (Riser Pipe)
31a Pipe Outlet
31b Pipe Internal
51a, 51b Heat Exchanger
53 Gas Bubble
54 Oil
56 Circulation Blower
80 Filtration Membrane Unit
81 Upper Cap
82 Individual Line (Filtered Water Outlet Pipe)
83 Buffer Line (Filtered Water Header Pipe)
84 Returning Line (Filtered Water Return Pipe)
$S_1$, $S_2$ Removal Space (Height)
$S_3$ Height of Filtration Membrane Unit
100 Oil-Water Separation System
$E_1$ Carrying-in and Carrying-out Opening
$E_2$ to $E_3$ Manhole

The invention claimed is:

1. A filtration membrane unit comprising a filtration membrane module, an upper cap, an individual line, a buffer line and a returning line;

wherein the filtration membrane module is formed in an elongated structure and has a filtration membrane with at least one opening portion, the filtration membrane is fixed and held to an upper sealing material, with at least one end portion of the filtration membrane being fixed to the upper sealing material;

the filtration membrane module and the upper cap, the upper cap and the individual line, the individual line and the buffer line, and the buffer line and the returning line are communicatively connected with each other, respectively;

the returning line is disposed along a longitudinal direction of the filtration membrane;

the buffer line and the returning line are intersectingly connected, the individual line and the upper cap are configured such that the filtration membrane is hung and extends in the same direction as the filtration membrane and next to the returning line when the filtration membrane unit is installed, and the filtration membrane is fixed to only the upper sealing material, and the filtration membrane unit is detachably connected to another line partially supporting the returning line and the filtration membrane unit from below on an end portion of the returning line.

2. The filtration membrane unit according to claim 1, wherein the filtration membrane is a plurality of hollow fiber membranes having both ends open, the hollow fiber membranes are folded in a longitudinal direction thereof and both ends of the hollow fiber membranes are fixed to the upper sealing material.

3. The filtration membrane unit according to claim 1, wherein the returning line is installed in substantially the center of a plurality of filtration membrane modules and surrounded thereby.

4. An oily water separator for removing oil from oily water, the oily water separator comprising
a vessel, a filtration membrane unit, an oily water feed line, a liquid with high oil concentration discharge line and a treated-water discharge line, the vessel having a vertical cylindrical body, curved upper and lower end portions and is configured to receive the oily water therein,
the oily water feed line being connected to a lower part of the vessel,
the filtration membrane unit is installed in the vessel,
the liquid with a high oil concentration discharge line is installed above the filtration membrane unit in a position of a surface of the oily water for discharging the liquid with a high oil concentration, and
the treated-water discharge line vertically supports the filtration membrane unit from below,
wherein the filtration membrane unit comprises a filtration membrane module, an upper cap, an individual line, a buffer line and a returning line configured to allow the filtration membrane module to be immersed into the oily water to perform filtration therein, the filtration membrane module and the upper cap, and the upper cap and the individual line, the individual line and the buffer line and the buffer line and the returning line being communicatively connected with each other, respectively,
the filtration membrane module having an elongated filtration membrane with at least one opening portion at at least one end of the elongated filtration membrane and the at least one end of the elongated filtration membrane being fixed to an upper sealing material, the returning line extending along the filtration membrane and being vertically installed on and communicatively in connection with the treated-water discharge line detachably,
the filtration membrane unit detachably connected to the treated-water discharge line vertically supporting the returning line and the filtration membrane unit from below on an end portion of the returning line, and
the oily water separator is configured to allow the treated-water flow upward inside of the elongated filtration membrane, the upper cap and the individual line to be collected in the buffer line, allow the collected water to flow downward through the returning line and flow through the treated-water discharge line which is installed in a lower side of the vessel.

5. The oily water separator according to claim 4, wherein the elongated filtration membrane is made of polytetrafluoroethylene.

6. The oily water separator according to claim 4, wherein the elongated filtration membrane is a hollow fiber membrane or tubular membrane.

7. The oily water separator according to claim 6, wherein the elongated filtration membrane is defined as a cylindrically-shaped hollow fiber membrane or tubular membrane having both ends open; the elongated filtration membrane is folded in a longitudinal direction thereof, and both ends of the elongated filtration membrane are communicatively connected to the upper cap.

8. The oily water separator according to claim 4, further comprising a gas bubble generation pipe for feeding gas bubbles toward the filtration membrane unit.

9. The oily water separator according to claim 4, further comprising an oil skimmer for recovering a liquid with a high oil concentration on or near a liquid surface of the oily water and the liquid with a high oil concentration discharge line is configured to discharge a recovered liquid with a high oil concentration.

10. The oily water separator according to claim 4, wherein there exists a removal space above the filtration membrane unit in the vessel for removing the filtration membrane unit and the removal space has a height substantially equal to or higher than a height of the filtration membrane unit.

11. The oily water separator according to claim 9, wherein the oil skimmer has a partition wall vertically disposed from an inside of a liquid toward a liquid surface to recover the liquid with a high oil concentration on or near the liquid surface of the oily water over the partition wall.

12. The oily water separator according to claim 4, wherein the elongated filtration membrane is defined as a cylindrically-shaped hollow fiber membrane or tubular membrane and the filtration membrane module has a plurality of the cylindrically-shaped hollow fiber membranes or tubular membranes.

13. The oily water separator according to claim 4, wherein the elongated filtration membrane is defined as a hollow fiber membrane, and a pore size of the hollow fiber membrane is 0.0001 to 1 μm.

14. The oily water separator according to claim 10, wherein the removal space has a volume sufficient to function as a work space.

15. The oily water separator according to claim 4, further comprising a rising flow channel for oily water disposed in the vessel and the rising flow channel extends upward from a lower portion of the vessel which is connected to the oily water feed line.

16. The oily water separator according to claim 4, further comprising a line for feeding a chemical installed in the oily water feed line.

17. An oil-water separating method for removing oil from oily water comprising a step of treating the oily water with the oily water separator according to claim 4.

18. The oil-water separating method according to claim 17, wherein the oil concentration in the oily water is 50 to 3,000 ppm and the oil concentration in the treated water is reduced to 5 ppm or less by filtering the oily water.

19. The oil-water separating method according to claim 17, wherein the temperature of the oily water inside the vessel is 10 to 150° C. and the pressure is 0 to 10 kg/cm$^2$G.

20. A method for exchanging the filtration membrane units in the oily water separator according to claim 10, the vessel in the oily water separator having, in an upper part thereof, a carrying-in and carrying-out opening capable of carrying the filtration membrane unit therefrom, the vessel also having manholes in an upper side portion of the vessel and in a lower part of the vessel wherein an upper side manhole is accessible to the removal space and a lower side manhole is accessible to a connection between the returning line and the treated-water discharge line, the method comprising:

releasing the connection between the returning line and the treated-water discharge line, by accessing from the lower side manhole; and hauling up the released filtration membrane unit into the removal space; and carrying out the hauled up released filtration membrane unit from the carrying-in and carrying-out opening.

21. The method for exchanging the filtration membrane units according to claim 20, the method further comprising:

inserting a filtration membrane unit for exchange into the vessel from the carrying-in and carrying-out opening at the upper part of the vessel;

placing the filtration membrane unit for exchange in the removal space;

placing the filtration membrane unit for exchange in an original place in which the removed filtration membrane unit was placed; and connecting the placed filtration membrane unit for exchange with the treated-water discharge line.

* * * * *